(12) United States Patent  
Miyawaki

(10) Patent No.: US 6,439,169 B1
(45) Date of Patent: Aug. 27, 2002

(54) EAR MARKS FOR LIVESTOCK REGISTRATION, PRINTING METHOD FOR EAR MARK, AND IDENTIFICATION METHOD USING THE EAR MARK

(75) Inventor: Yutaka Miyawaki, Tokyo (JP)

(73) Assignee: Surge Miyawaki Co., Ltd., Tokyo (JP)

( * ) Notice: Subject to any disclaimer, the term of this patent is extended or adjusted under 35 U.S.C. 154(b) by 0 days.

(21) Appl. No.: 09/601,874

(22) PCT Filed: Dec. 9, 1999

(86) PCT No.: PCT/JP99/06927

§ 371 (c)(1),
(2), (4) Date: Aug. 9, 2000

(87) PCT Pub. No.: WO00/33648

PCT Pub. Date: Jun. 15, 2000

(30) Foreign Application Priority Data

Dec. 9, 1998 (JP) .......................................... 10-350531
Feb. 18, 1999 (JP) .......................................... 11-039974

(51) Int. Cl.[7] .................. A62B 35/00; A01K 29/00; G09F 3/00
(52) U.S. Cl. ..................... 119/858; 119/655; 40/300
(58) Field of Search ............................... 119/653, 654, 119/655, 858; 283/80; 493/961; 40/300

(56) References Cited

U.S. PATENT DOCUMENTS

| | | | |
|---|---|---|---|
| 2,563,572 A | * 8/1951 | Alonso | 40/300 |
| 3,346,980 A | 10/1967 | Wallace | 40/302 |
| 3,360,877 A | * 1/1968 | Estep | 40/300 |
| 3,650,058 A | * 3/1972 | Wittcke et al. | 40/300 |
| 4,574,742 A | * 3/1986 | Morgan, Jr. | 119/654 |
| 4,718,374 A | * 1/1988 | Hayes | 119/655 |
| 5,473,830 A | * 12/1995 | Doble | 40/300 |
| 6,196,593 B1 | * 3/2001 | Petrick et al. | 283/80 |

FOREIGN PATENT DOCUMENTS

| | | |
|---|---|---|
| EP | 95930 A | 12/1983 |
| EP | 296256 A | 12/1988 |
| FR | 2 762 425 | 10/1998 |
| JP | 58-179421 A | 12/1983 |
| JP | 60-36069 | 12/1985 |
| JP | 8-5379 A | 1/1996 |
| NZ | 219430 | 2/1987 |
| NZ | 216931 | 1/1988 |

* cited by examiner

Primary Examiner—Charles T. Jordan
Assistant Examiner—Elizabeth Shaw
(74) Attorney, Agent, or Firm—Finnegan, Henderson, Farabow, Garrett & Dunner, L.L.P.

(57) ABSTRACT

Conventionally, the last some digits of the Animal Registration Number printed on ear tag for identifying an individual animal in a wide area like a nation are simply enlarged for farm use. However, the simply enlarged farm use number is not a desirable number for the farm to use and is inconvenient for the farm to control animals on the farm, The present invention provides the improvement of making the ear tag, containing an Animal Registration Number CN controlled by the specific management department consisting of codes including numerals, letters, or barcodes, to be used by attaching it to an ear of an animal, in order to identify an individual animal. The Animal Registration Number CN having multiple digits prepared at the specific management department is printed at least on one of the sides of the ear tag. Some part of the Animal Registration Number CN is enlarged and printed on the ear tag as a farm use number FN in accordance with a request from an individual farm by using a minimum number of digits. The enlarged farm use number FN is generated by selecting some digits from the Animal Registration Number CN and is printed on the same or a different side of the ear tag where the Animal Registration Number is printed, so that the farm use number can be effectively created from the Animal Registration Number CN.

22 Claims, 25 Drawing Sheets

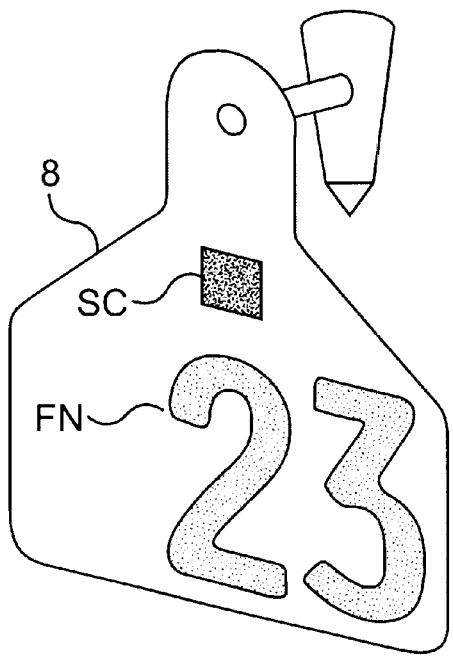
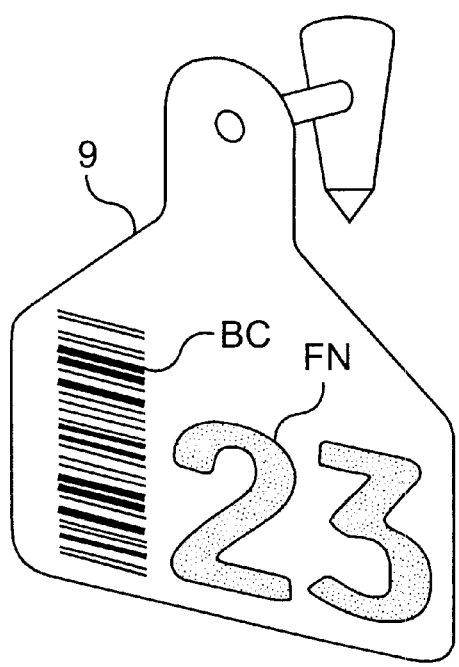
FIG. 14  FIG. 15
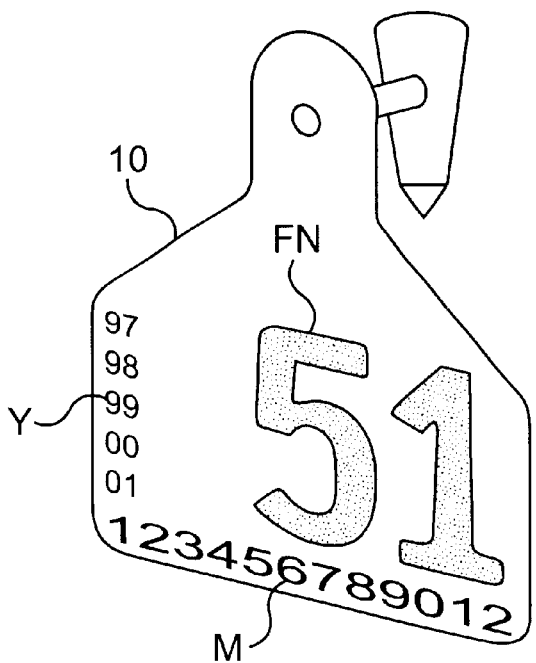
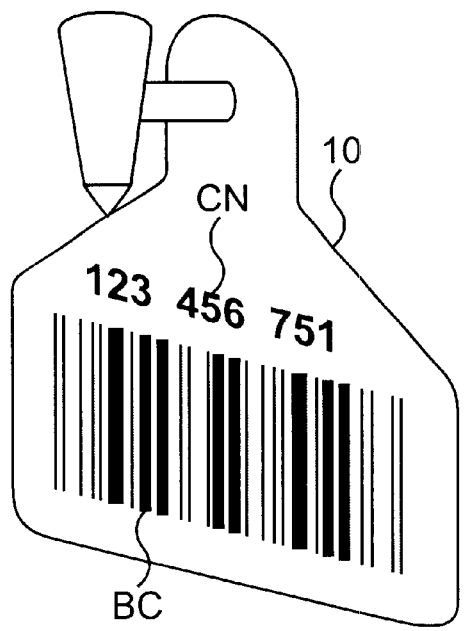
FIG. 16A  FIG. 16B

EAR MARKS FOR LIVESTOCK REGISTRATION, PRINTING METHOD FOR EAR MARK, AND IDENTIFICATION METHOD USING THE EAR MARK

TECHNICAL FIELD

The present invention relates to a registration ear tag to be attached to ears of animals, a method of printing such an ear tag, and an individual identification method using such an ear tag, and particularly to an animal ear tag, a method of printing such an ear tag and an individual identification method using such an ear tag, in which the ear tag is printed with: an Animal Registration Number; and a part of the Animal Registration Number, which part is enlarged as a farm-use individual identification number, such that individual identification of animals on farms can be readily performed correspondingly to the number of animals bred or fed on each farm, in a manner comparable to typical ear tags.

BACKGROUND ART

Conventional methods for individually identifying animals bred in farms utilize can use muzzle patterns of cattle by the Japanese Wagyu Beef Registration Association and black and white body patterns of Holstein cattle by the Holstein Cattle Association. Although such individual identification methods are accurate, there is a problem that individual cattle cannot be identified, without their registration certificates, in the field, thereby not allowing quick individual identification.

Meanwhile, in countries other than Japan, such as in Europe, there has been practiced a dairy cow registration system utilizing ear tags. Each ear tag is constituted of two plates of soft plastic each having a length and a width of several centimeters, respectively, in which the ear tag is attached to an ear of a cow by passing one ends of the plates through the ear. In this case, the two plates constituting the ear tag are designed to be integrated with each other upon such attachment, so as to prevent illegal reuse of the ear tag.

In such a dairy cow registration system utilizing ear tags, the surface of an ear tag is printed with an Animal Registration Number, so that the individual identification of animals cannot be done satisfactorily by confirming the Animal Registration Number.

Meantime, the Animal Registration Number to be indicated on a common ear tag typically includes 2 to 3 digits for visibility, since it is sufficient to identify animals within one farms. There will be thus required an go additional design for such ear tags, if they are to be used for identifying all the cattle in Japan.

Turning to Europe where farm registration is practiced at the national level, there has been such a problem that when numbers of more than 8 digits, necessary for registration, are directly printed on ear tags, the size of numerals or figures indicating an Animal Registration Number becomes too small to easily see, Thus, the following procedure has been conducted in Europe: to enlargingly print numerals of the last 4 digits of an Animal Registration Number; or to indicate an Animal Registration Number in multiple rows so as 0o subdivide the upper digits into an area code and a farm code and to enlargingly print the lowermost 4 digits as a farm-use individual identification number on an ear tag. (Hereinafter, the expression "numeral(s) at digit(s)" will be simply shortened to "digit(s)", for expediency, as the case may be.)

However, the animal registration system utilizing ear tags, as used in Europe, has the following two problems.

(1) When only the last 4 digits of an Animal Registration Number excluding a check digit are enlargingly printed and the Animal Registration Number is issued in the ascending order from a lower number, farms are receive ear tags carrying enlargedly printed farm-use individual identification numbers of 4 digits, respectively, which numbers are consecutive correspondingly to the issued sequence, leading to difficulty in individually managing cattle by such ear tags. Namely, for a farm breeding 40 cows, among average farms breeding 40 to 50 cows, it is not always possible to obtain the desired numbers, such as from "0001", to "0040", which can be readily identified and managed. For example, there may be delivered 40 ear tags carrying enlarged farm-use individual identification numbers from "3678" to "3717". Thus, it is not easy to individually manage cows by visually and instantaneously recognizing such 4-digit farm-use individual identification numbers, even when they have been enlarged. In addition, there has been such a problem of duplication of enlarged farm-use individual identification numbers.

(2) In the method where the upper digits of an Animal Registration Number are subdivided into an area code and a farm code (or farmland code) while the lowermost 4 digits are enlargedly printed on an ear tag as a farm-use individual identification number, it is assumed that 4-digit numbers from "0001" to "9999" are uniformly assigned to each farm irrespectively of a farm size and those numbers once assigned are never issued again. Thus, there has been a problem of lack of numbers on an extremely large farm, upon exceeding "9999". Conversely, there has been another problem of occurrence of those numbers (so-called "dead numbers") which will be never used even after a lapse of tens of years at an averaged farm level (breeding approximately 50 animals), thereby not providing efficient usage of farm use numbers.

As described above, the farm-use enlarged numbers have been always printed with 4 digits in Europe. According to such a method, it is only possible to select a particular Animal Registration Number 10,000 (ten thousands) ways, in selecting such an Animal Registration Number from the 4-digit numbers consisting of (0000) to (9999). However, the present applicant has discovered that it becomes possible to produce large numbers with drastically increased frequency if the numbers to be enlarged are printed in a 1-digit form in case of 0 to 9, in a 2-digit form in case of 11 to 99, and so forth, even under the same condition of 10,000 given of Animal Registration Numbers (0 to 9999). In other words, it becomes possible to produce unique Animal Registration Numbers to be partially enlarged at the request of farms without wastefulness, by indicating such large numbers with a required minimum number of digits. This is extremely simple, but provides a large effect.

DISCLOSURE OF THE INVENTION

It is therefore an object of the present invention to provide an animal ear tag, a method of printing such an ear tag, and an individual identification method using such an ear tag, by which there can be effectively issued Animal Registration Numbers within a predetermined number of digits substantially without restriction, and those desired individual identification numbers suitable for readily and individually identifying animals in respective farms can be enlargedly printed as requested by the farms.

To achieve the above object, the present invention provides, as a first embodiment, an ear tag, containing an Animal Registration Number consisting of codes including numerals, letters, or barcodes, to be used by attaching it to an ear of an animal in order to identify an individual animal, characterized in that: the Animal Registration Number having multiple digits is printed at least on one of the sides of the ear tag, and further, some part of the Animal Registration Number is enlarged and printed on the same or a different side of the ear tag where the Animal Registration Number is printed, in accordance with a request from an individual farm for identifying each animal on the farm, by using a minimum number of digits of the Animal Registration Number.

In the first embodiment, there can be provided an ear tag wherein some part of the Animal Registration Number to be enlarged is selected from adjacent digits of the Animal Registration Number, when the enlarged number to be printed on the ear tag has multiple digits.

In the first embodiment, there can be also provided an ear tag wherein some part of the Animal Registration Number to be enlarged is selected discontinuous from the digits of the Animal Registration Number, when the enlarged number to be printed on the ear tag has multiple digits.

In the above two cases, where the enlarged number to be printed on the ear tag has multiple digits, there can be provided an ear tag wherein one or more digits of the Animal Registration Number enlarged and printed on the ear tag, as the enlarged number, can be distinguished in the multiple digits of the Animal Registration Number, in relation to other digits thereof, by eye.

Similarly, in the above two cases where the enlarged number to be printed on the ear tag has multiple digits, there can be provided an ear tag wherein information on which digits of the Animal Registration Number are enlarged,:in size and printed on the ear tag is contained in a barcode when the Animal Registration Number is printed on the ear tag in the form of a barcode.

Further, in the first embodiment, there can be provided an ear tag wherein the enlarged number includes a code which is not included in the Animal Registration Number, and the code is inserted in the Animal Registration Number as a dummy digit in a form where the dummy digit can be distinguished from the other digits of the Animal Registration Number.

Moreover, in all of the aforementioned cases, there can be provided an ear tag wherein the enlarged number is printed on the left side, right side, or center of the ear tag, and the space is left on at least one of the left side and right side of the enlarged numbers, when the enlarged number has fewer digits than the maximum number of digits that can be printed on the ear tag. In this case, a guide mark for indicating the space to be filled in by a code can be printed on the space.

Meanwhile, there can be provided an ear tag wherein the enlarged number is a one-digit number or a two-digit number, and at least one figure "0" having the same size as the enlarged number is printed on the left side of the enlarged number in accordance with the digit of the enlarged number to make the enlarged number a three or less digit number.

Further, there can be provided an ear tag wherein the enlarged number is a one-digit number or a two-digit number, and at least one figure "0" having a smaller size than the enlarged number is printed on the left side of the enlarged number in accordance with the digits of the enlarged number to make the enlarged number a three or less digit number.

Notes when a figure "0" is to be printed on the left side of the enlarged number, the color of the figure "0" may be thinner than the color of the enlarged number comprised of a one-digit number or a two-digit number, or the figure "0" may be printed as an outline character.

Moreover, the following two methods are possible as a method of printing an ear tag, according to a second embodiment of the present invention for achieving the aforementioned object, According to a first printing method, there is provided a method of printing the Animal Registration Number controlled by the specific organization consisting of codes including numerals, letters, or barcodes and an enlarged number, on an ear tag which is used by attaching it to an ear of an animal in order to identify an individual animal, comprising the steps of: requesting the enlarged number, which is a private number having four digits, at most, necessary to identify an individual animal in an individual farm, to the specific organization from the individual farm, through some channel of supply; selecting one of the Animal Registration Number, which includes all or all but one of the figures consisting of each digit of the required enlarged number, from the database of the Animal Registration Number previously prepared at the specific organization; transmitting the selected Registration Number and the required enlarged number to the ear tag issuing organization from the specific organization; and printing the Animal Registration Number transmitted from the specific organization on the ear tag and printing the enlarged number included in the Animal Registration Number, in a minimum number of digits, at the ear tag issuing organization.

According to a second printing method, there is provided a method of printing the Animal Registration Number controlled by the specific organization consisting of codes including numerals, letters, or barcodes and an enlarged number on an ear tag which is used by attaching it to an ear of an animal in order to identify an individual animal, comprising the steps of: regularly transmitting unused numbers in the database of the Animal Registration Number previously prepared at the specific organization to the database provided at the ear tag issuing organization; arranging a set of figures indicating the enlarged number which is necessary to be printed on the ear tag enlarged in a minimum number of digits in order to identify an individual animal at the individual farm, and then selecting an Animal Registration Number which includes all of the figures of the arranged enlarged number somewhere in the multiple digits thereof from the database of the tag issuing organization; transmitting the selected Animal Registration Number to the database of the specific organization from the ear tag issuing organization and deleting an unused number corresponding to the selected Animal Registration Number from the database of the specific organization; and printing the selected Animal Registration Number on the ear tag and printing the enlarged number in a large size on the ear tag in a minimum number of digits, at the ear tag issuing organization, after transmitting the selected Animal Registration Number to the database of the specific organization from the ear tag issuing organization.

Further, the following two methods are possible as an individual identification method utilizing an ear tag, which individual identification method is a third embodiment of the present invention.

As a first individual identification method, there is provided a method of identifying an individual animal by distinguishing it from another using the ear tag according to the first embodiment and a data processor at the place where animals are collected from each farm, comprising the steps of: inputting the Animal Registration Number printed on the ear tag and further inputting a farm use number to the data processor; detecting a duplication of the farm use number among the ear tags attached to each animal grouped at designated place for a specific purpose by the data processor; and displaying an instruction to add and indicate at least one digit of the figures included in the Animal Registration Number to the farm use number in order to distinguish the duplicated farm use number from another when the data processor detects the duplication of the farm use number on the ear tag.

As a second individual identification method, there is provided a method of identifying an individual animal by distinguishing it from another using the ear tag according to the first embodiment, a card for subsidiary use with the ear tag and containing all of the information provided by the ear tag, and a data processor at the place where animals are collected from each farm, comprising the steps of; inputting the Animal Registration Number printed on the ear tag or the card and further inputting a farm use number to the data processor; detecting a duplication of the farm use number among the ear tags attached to each animal grouped at designated place for a specific purpose by the data processor; and displaying an instruction to add at least one digit of the figures included in the Animal Registration Number to the farm used number in order to distinguish the duplicated farm use number from another when the data processor detects the duplication of said farm use number on the ear tag.

According to the present invention, respective farms can obtain ear tags printed with enlarged farm use numbers with the minimum number of digits required by the farm in addition to printed Animal Registration Numbers managed by a predetermined organization, so that the enlarged farm use numbers become legible to thereby facilitate individual identification and management of animals in respective farms.

Further, visual recognition of an Animal Registration Number or decryption of a barcode will show which portion of the Animal Registration Number the numerals of an enlarged number have been selected from. Moreover, by adding a dummy numeral into the enlarged number, it becomes possible to effectively utilize Animal Registration Numbers in a database of a predetermined organization.

Furthermore, the space at at least one of the right and left sides of the enlarged number allows arbitrary entrance of a symbol and/or numeral by a farm, to thereby permit distinguishing duplicated enlarged numbers front each other. In this case, a guide mark(s) printed at the space facilitates the task such as entering a letter and/or numeral in the space.

By printing a numeral(s) "0" at the left side of a 1-digit or 2-digit enlarged number up to the extent of total 3 digits which still allows the enlarged number to be legible, the number of digits of enlarged numbers can be standardized or uniformalized.

Further, according to the individual managing method utilizing an ear tag of the present invention, even upon occurrence of duplication of enlarged numbers when animals attached with ear tags printed with enlarged numbers have been collected such as at a market or abattoir, it is still possible to mutually distinguish individual animals to thereby manage them.

BRIEF DESCRIPTION OF THE DRAWINGS

Such as the aforementioned and other objects, features and advantages of the present invention will be described in detail with reference to the embodiments shown in the accompanying drawings, wherein:

FIG. 14 is a perspective view showing an animal registration ear tag according to an eighth embodiment of the present invention;

FIG. 15 is a perspective view showing an animal registration ear tag according to a ninth embodiment of the present invention;

FIG. 16A is a perspective view of an animal registration ear tag according to a 10th embodiment of the present invention, when viewed from the front side of the tag;

FIG. 16B is a perspective view of the animal registration ear tag according to the 10th embodiment of the present invention, when viewed from the rear side of the tag;

Figure 26:
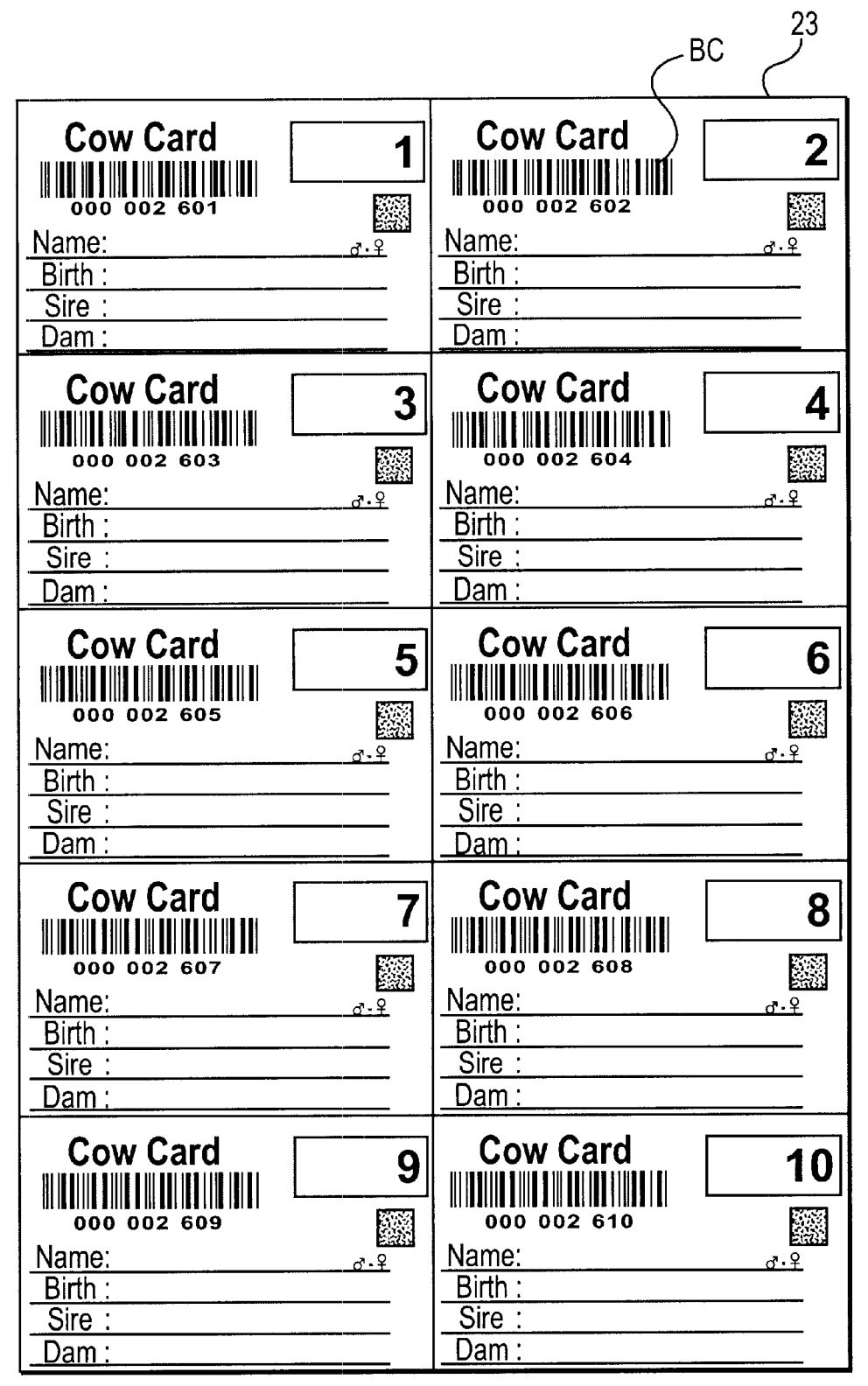

FIG. 26 is a view showing an example of a card recorded with an individual cow information in a barcode form and attached to a cow;

DETAILED DESCRIPTION OF THE PREFERRED EMBODIMENT

The concrete embodiments according the present invention will be described in detail hereinafter with reference to the accompanying drawings. However, before describing a constitution of an ear tag, a method of printing such an ear tag, and an individual identification method using such an ear tag according to the present invention, there will be described ear tags already used in Europe.

Figure 1:
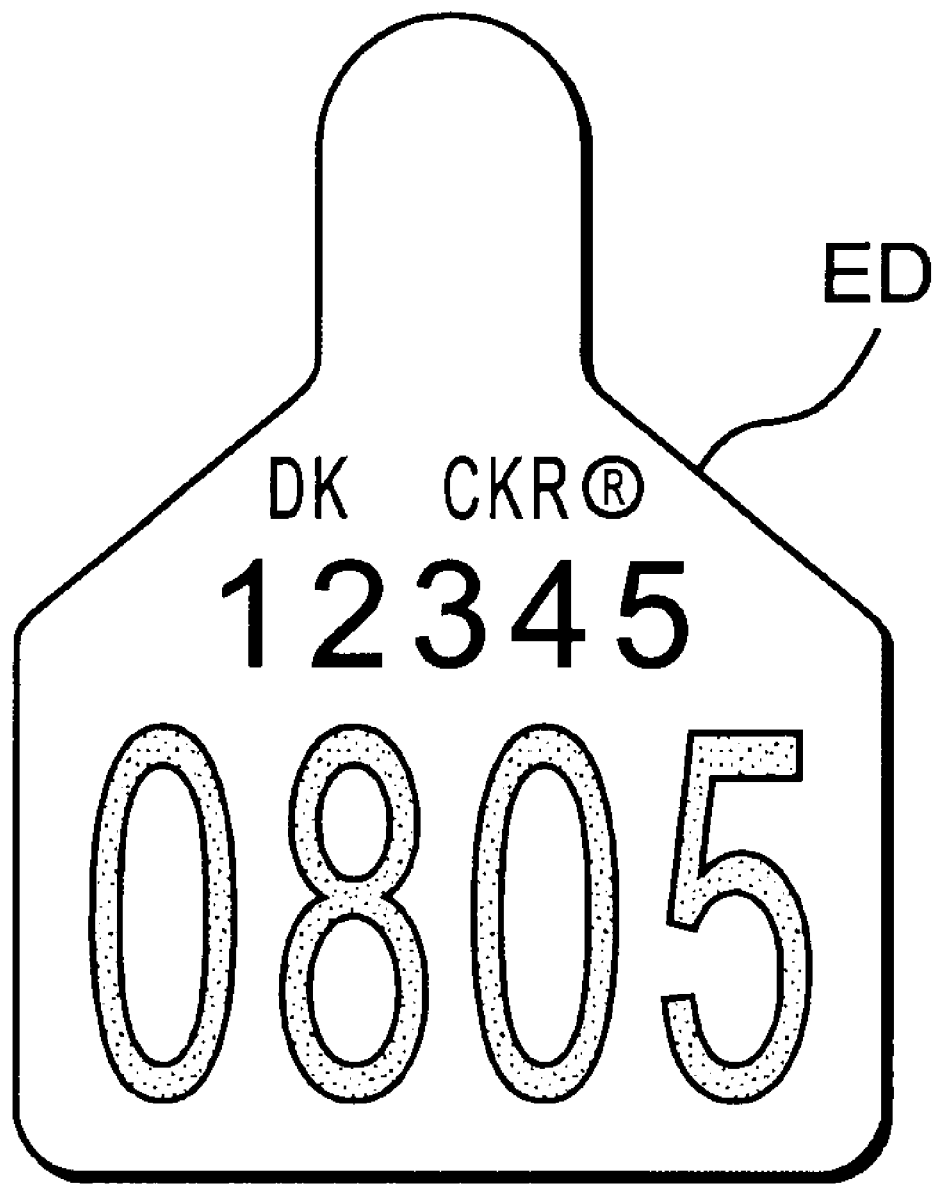
FIG. 1 is a front view of an appearance of an ear tag being used in Denmark.

FIG. 1 shows an ear tag ED being used in Denmark. The ear tag ED in Denmark is printed in three rows. The code in the uppermost row indicates that this ear tag is a registration ear tag in Denmark. The number "12345" at the middle row is a farm code or farmland code. Further, the enlargedly printed 4-digit number "0805" at the lowermost row is an intra-farm consecutive cow number.

In Denmark, the farm use number and cow number printed in the middle and lowermost rows, respectively, of the ear tag cooperatively constitute an Animal Registration Number (unique number). The 4-digit cow number, which is enlargedly printed at the lowermost row and is to be used in a daily farm operation, includes a numeral(s) "0", such that an ear tag printed with "0001" is firstly distributed in each farm and the numbered portion (i.e., effective numeral portion) of the tag becomes two digits such as "0011" as the number of cows increases. Since those numbers once issued are never issued again, the numbered portion of a cow number in each farm is consecutively increased to 3 digits and then 4 digits.

However, considering the number of cows (44 cows in the year 1995) bred in an averaged farm in Denmark, the 4-digit number including a numeral(s) "0" includes many unnecessary digits, resulting in a restricted print size of the enlarged number and in difficulty in identifying the 4-digit number. Further, in a farm where a calf has been born, the cow number for the calf has no duplications. However, when the calf is transferred so another pasture, it is impossible to avoid duplication of the cow number at the new pasture.

On the other hand, the critical problem in the cow registration system utilizing an ear tag in Denmark resides in that the unique numbers (Animal Registration Numbers) have not been utilized effectively. This is because the unique number is constituted by combining a farm number or farm use number with a 4-digit cow number. Explaining in detail, the administrative department as a specific organization in Denmark is supposed to assign a unique number code frame comprising 9,999 (approximately 10,000) numbers for each farm. However, in a calculation by assuming that the averaged number of bred cows is largely evaluated as 50 cows and an annual update ratio of cows is 30% in Denmark, only the numbers corresponding to about 800 cows will be actually used even over half a century (i.e., over 50 years), resulting in a utilization ratio of as low as 8% of the assigned numbers. Namely, there has been a problem of so-called "dead numbers" in which most of assigned unique numbers will not be used. This is inappropriate, in view of the efficiency of the system.

Figure 2A:
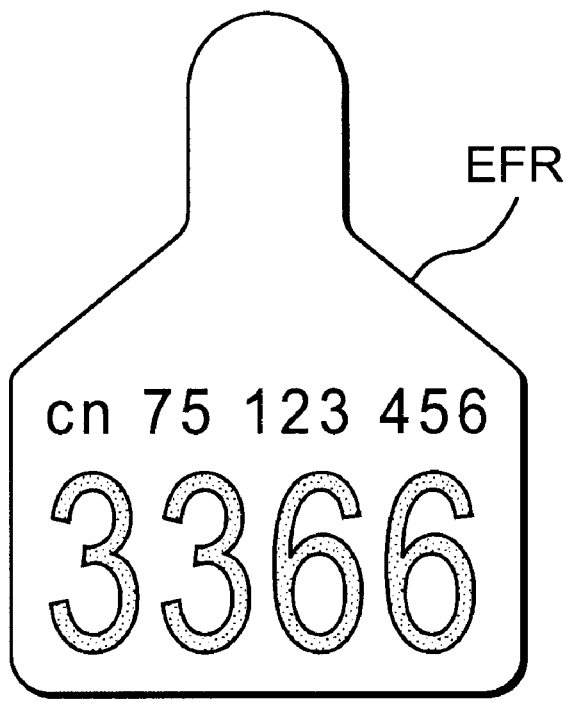
FIG. 2A is a front view of an appearance of an ear tag for a right ear being used in France.
Figure 2B:
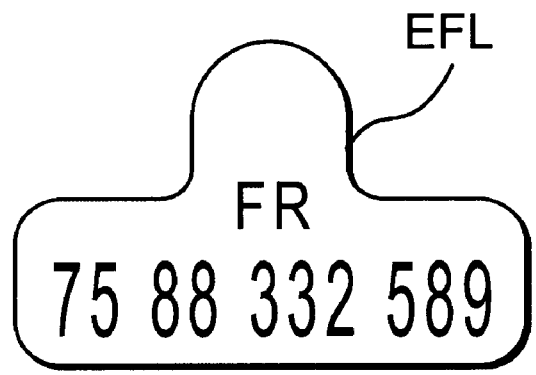
FIG. 2B is a front view of an appearance of an ear tag for a left ear being used in France.

FIGS. 2A and 2B show ear tags EFR and EFL being used in France, respectively, and FIG. 2A shows the ear tag EFR for a right ear and FIG. 2B shows the ear tag EFl for a left ear. The cow managing method utilizing ear tags conducted in France is to individually identify cows by attaching right and left ear tags different from each other.

As shown in FIG. 2A, the right ear tag EFR carries two-row printing, in which the alphabetical letters and numerals included in the upper row correspond to prefecture, district and farm codes in France such that "75" is a prefecture code, "123" is a district code and "456" is a farm code. The number in the lower row is a consecutive number indicating an intra-farm cow number, similarly to that in Denmark. As shown in FIG. 2B, also the left ear tag EFL carries two-row printing, in which the alphabetical letters in the upper row correspond to a country code and the number in the lower row is an administrative number issued by the administrative authority.

As described above, the administrative numbers used for ear tags in France include 14 digits for a right ear and 12 digits for a left ear, in total 26 digits. Thus, it requires a long time to retrieve such a 26-digit number from a database, and there exists such a possibility of input error in the 26-digit administrative number. Further, since the ear tag in France has the cow number constituted of a 4-digit number similarly to that in Denmark, the printed size of the numerals is too small even though they are enlarged, resulting in difficulty in identifying the 4-digit number on a farm. Moreover, the cow managing system by the ear tag in France has a problem of a low utilization ratio of the numbers assigned to respective farms, similar to the system in Denmark.

Figure 3A:
FIG. 3A is a front view of an appearance of an ear tag being used in Netherlands.

FIG. 3A shows an ear tag EH being used in Netherlands. This ear tag EH is also printed with three rows. In Netherlands, the Animal Registration Number to be printed on an ear tag comprises 9 digits, without using a farm code nor an area code. Essentially, these 9 digits include 8 digits as the Animal Registration Number and the last one digit as a check digit. Further, in Netherlands, the middle row is a barcode including the Animal Registration Number, and the lowermost row is a number obtained by enlarging the lowermost 4 digits of the (essential) Animal Registration Number. The enlargedly printed number of the essential lowermost 4 digits is provided for visibility in a farm, and this lowermost 4-digit number is used as a farm-use individual identification number (hereinafter abbreviated to "arm use number"). The farm use number enlargedly printed in the lowermost row includes a numeral "0" at a relevant upper digit when such an upper digit does not include one of numerals "1" to "9".

Figure 3B:
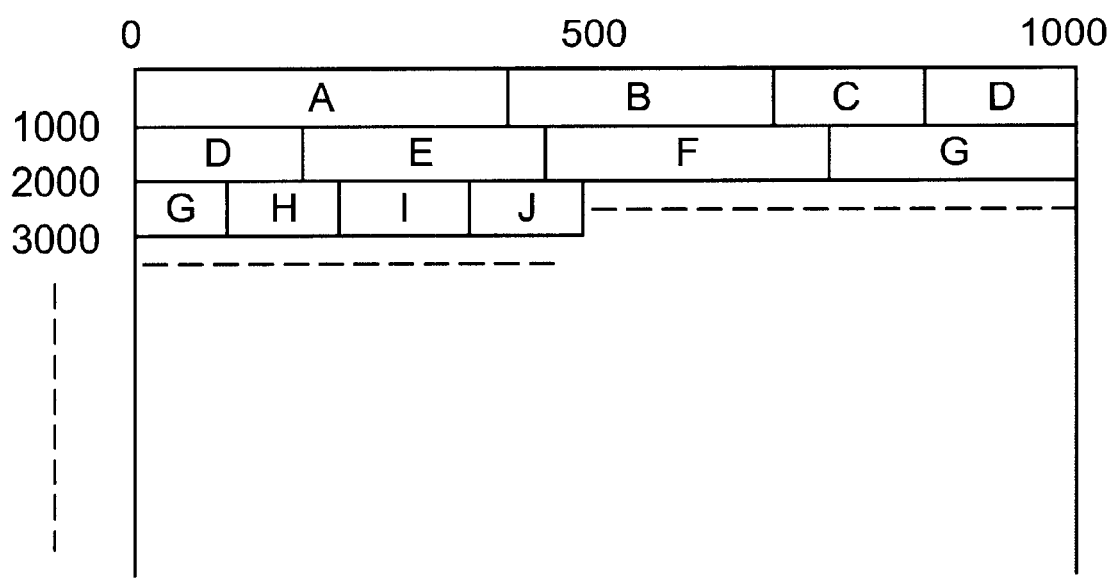
FIG. 3B is an explanatory view showing a method to assign Animal Registration Numbers in a conventional Animal Registration Number book.

As shown in FIG. 3B, this 9-digit Animal Registration Number is issued in the ascending order from a lower value of the Animal Registration Number, and sequentially assigned to respective farms. This leads to the complete or perfect usage of the numbers, and thus superior in effective usage of the numbers.

However, as described hereinafter, there have been problems on farms actually using such an ear tag EH as defined by the Dutch cow managing system.

The first problem is that no regularity or consistency is found in the lowermost 4-digit farm use number of an ear tag EH printed with an Animal Registration Number and distributed from the administrative department. For example, when a certain farm has annually requested ear tags for 40 cows, there may be distributed ear tags for 40 cows including lowermost 4-digit numbers from "2478" to "2517" in the first year, from "0987" to "1126" in the second year, and from "5876" to "5915" in the third year. Thus, lowermost 4-digit numbers or lowermost 4 digits of ear tags distributed in different years do not include any relevancy or regularity for deducing the distribution year. This results from the fact that those numbers corresponding to the requested number of cows are sequentially selected from consecutive Animal Registration Numbers prepared in the database possessed by the administrative department, and only the lowermost 4 digits of the selected Animal Registration Numbers are enlargedly printed, respectively.

These 4-digit farm use numbers enlargedly printed for farms without regularity have caused such an upset situation that the introduction time of animals cannot be deduced upon identifying cows in farms, thereby obstructing a smooth breeding and managing operation by visual recognition of a farm use number.

Further, for example, even if the administrative department issuing ear tags compares the farm use numbers to be issued at the pertinent time with those already issued to a relevant farm at the previous time and assigns lowermost 4-digit farm use numbers greater than the previous ones, it is difficult to intuitively identify 4-digit farm use numbers lacking consecutiveness and regularity of distribution years.

Moreover, since the averaged number of cows bred in dairy farms in Netherlands is only 46, 4-digit farm use numbers are too large to individually identify cows in an averaged farm and are complicated even though the numbers are enlargedly printed. Thus, there are frequently found farms which individually identify cows such as by attaching neck tags carrying arbitrarily selected numbers, to cows in addition to registered ear tags.

In addition to the aforementioned problems, the most critical problem in the Dutch animal managing system utilizing ear tags is that farm use numbers are duplicatedly issued. This duplication of farm use numbers enlargedly printed on ear tags is dangerous, since the usage or purpose of ear tags is to individually identify cows.

There will be now described the duplication of enlargedly printed farm use numbers. Farm use numbers include approximately 10,000 (ten thousand) numbers from "0001" to "9999". Usage of these numbers in a consecutive-number manner and assignment thereof to farms will not result in duplication of farm use numbers, during the assignment up to the first 10,000 cows. However, at the time when the Animal Registration Number has exceeded 10,000, ear tags are distributed with farm use numbers sequentially identical with those printed on ear tags distributed for the first 10,000 cows.

Namely, for example, the farm use number of a cow ear tag having an Animal Registration Number "000,000,010", becomes identical with that of "000,010,010", since both farm use numbers are duplicated "0010" (note, check digits are not considered at all, in this case). Then, it cannot be ignored that the ear sag printed with the duplicated farm use number may be distributed to the same farm. The larger the number of animals per farm, the more often the duplication of arm use numbers.

Figure 4:
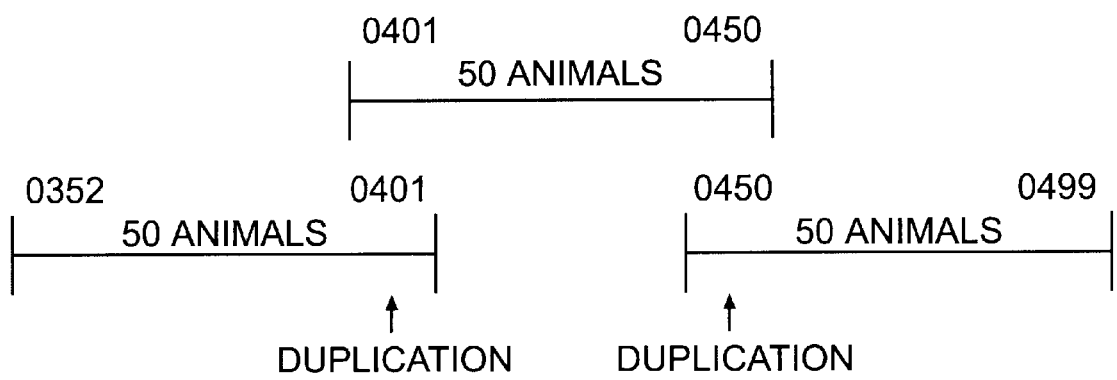
FIG. 4 is a view explaining duplication of consecutive numbers in a managing method adopting the ear tag in Netherlands.

As shown in FIG. 4, for example, when farm use numbers from "0401" to "0450" have been firstly distributed for 50 cows of a certain farm, there wilt be generated a duplicated farm use number(s) in this farm for 50 cows at the next time when there are assigned 50 pieces of consecutive numbers ascendingly started from "0352" or descendingly started from "0499". At the next or third distribution time, there is further extended the duplication range of farm use numbers. The duplication possibility of farm use numbers is a value obtained by subtracting a possibility of nonoccurrence of duplication from all combinations. Thus, from the calculation based on 50 cows approximating the averaged number of bred cows in Netherlands while assuming that 10,000 kinds of numbers exist, there are obtained duplication possibilities of 2.9% for the 3rd year, 5.8% for the 4th year, 9.56% for the 5th year, and about 14% for the 6th year. This duplication possibility is further increased when cows are transferred from a farm to another.

As described above, the Dutch animal managing system utilizing ear tags has no wastefulness concerning the occurrence of unique Animal Registration Numbers, but involves the aforementioned decisive problem concerning the most important intra-farm individual identification of cows.

Referring to the procedure of the U.S. Holstein Cattle Association not shown herein, the number to be printed on an ear tag is constituted of three rows including uppermost, middle and lowermost rows printed with a logo, a registration number and an enlarged farm use number, respectively. The enlarged farm use number is allowed to be arbitrarily issued at the request of a farm, and is of an independent form having no relationship with the registration number at the middle row. This leads to a problem that cows cannot be individually identified in a correct manner by farm use numbers at a cow-collecting place such as a market. There is a further problem in managing the whole system, such as the possibility of duplication of farm use numbers which is difficult to check.

As explained above, the animal managing systems utilizing ear tags in European countries involve several problems. The present invention therefore provides an animal registration ear tag, a method of printing such an ear tag, and an individual managing method: in which Animal Registration Numbers are issued without wastefulness in an animal managing system utilizing an ear tag printed with an Animal Registration Number managed by a predetermined administrative department; in which these Animal Registration Numbers are related to the enlarged farm use numbers for individually identifying, to thereby manage, respective cows; and in which numbers desired by farms can be printed as farm use numbers.

Firstly, there will be described a constitution of an animal registration ear tag according to the present invention with reference to FIGS. 5A through 16B. To simplify the explanation, there will be described a situation where Animal Registration Numbers include 9 digits, while farm use numbers include 3 digits at the maximum.

Figure 5A:
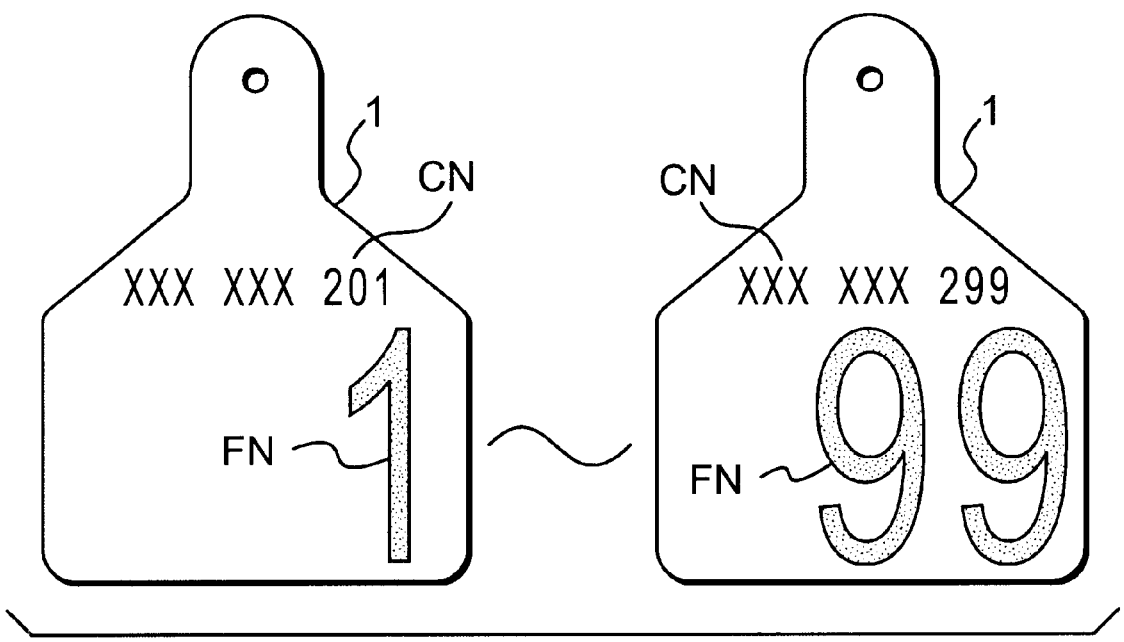
FIG. 5A is a front view of an animal registration ear tag according to a first embodiment of the present invention.
Figure 5B:
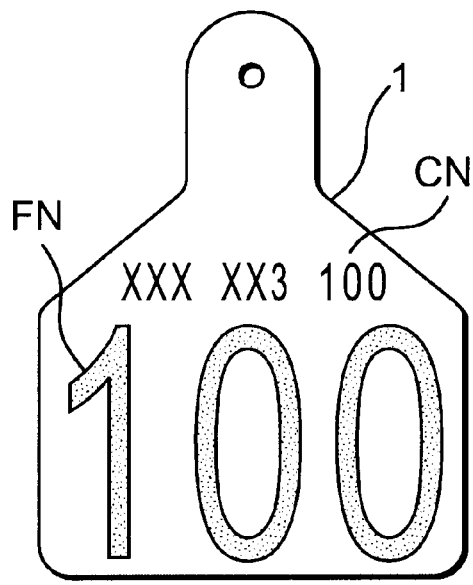
FIG. 5B is a front view of an animal registration ear tag according to another example of the first embodiment of the present invention.

FIG. 5A and FIG. 5B show examples of an ear tag 1 according to a first embodiment of the present invention. The ear tag 1 is basically printed with two rows. The upper row is an Animal Registration Number CN for registering an animal, and the lower row is a farm use number FN which, exactly, is a farm-use individual identification number enlargedly printed to individually identify an animal on a farm. Note, although the Animal Registration Number CN may include letters and other symbols such as Japanese katakana characters, Japanese hiragana characters and alphabetical letters, there will be described hereinafter Animal Registration Numbers CN fully constituted of numerals only, for simplified explanation. Check digits are also excluded from the explanation.

In the first embodiment, the farm use number FN is provided as an enlarged number, by enlargingly printing a portion of the Animal Registration Number CN. In addition, the farm use number FN as the enlarged number printed in the lower row is provided by indicating, in a required minimum number of digits, the number requested by a farm or adapted to be readily used by a farm. Namely, the farm use number FN in this embodiment is printed by a number excluding prefixed "0('s)" thereof. For example, when numbers from "1" to "99" of one digit or two digits are required as farm use numbers FN, the ear tags 1 are simply printed with meaningful numerals such as from "1" to "99", without printing meaningless numeral "0('s)" which have been otherwise prefixed in Europe such as in a manner from "0001" to "0099".

Then, the farm use number FN of the ear tag 1 of this embodiment is provided by enlargingly printing the last digit(s) of the Animal Registration Number CN. Thus, in FIG. 5A, the farm use number FN "1" is provided by enlargingly printing the last 1digit of the Animal Registration Number CN "XXXXXX201" (where X is selected from numerals from 0 to 9), and the farm use number FN "99" is provided by enlargingly printing the last 2 digits of the Animal Registration Number CN "XXXXXX299". Note, FIG. 5A shows the examples where the farm use numbers FN from "1" to "99" are provided by enlargingly printing the last 1digit or last 2 digits of the consecutive Animal Registration Numbers CN from "XXXXXX201" to "XXXXXX299". However, the Animal Registration Numbers CN are Dot necessarily consecutive. For example, the farm use number FN "49" may be provided by enlargingly printing the numerals at the last 2 digits of an Animal Registration Number CN "XXXXXX849".

As described above, the examples described concerning FIG. 5A relate to the situation where the farm use numbers FN comprise one digit or two digits. FIG. 5B shows a situation where the farm use number FN comprises 3 digits. Note that the printing position and arrangement of the Animal Registration Number CN and farm use number FN are not limited to the above.

FIGS. 6A through 6D show examples of an animal registration ear tag 2 according to a second embodiment of the present invention. Also the ear tag 2 of this embodiment is basically printed with two rows. The upper row is an Animal Registration Number CN for registering animals, and the lower row is a farm use number FN which, exactly, is a farm-use individual identification number for individually identifying an animal in a farm.

In the ear tag 1 of the first embodiment, the farm use number FN is provided by enlargingly printing the last digit(s) of the Animal Registration Number CN. In the ear tag 2 of the second embodiment, the farm use number FN is provided by enlargingly printing digits selected arbitrarily or at random from the Animal Registration Number CN. In this situation, it may be required to confirm by eye, which digits of the Animal Registration Number ON have been enlargedly printed as the farm use number FN. Providing for such a situation, the ear tag 2 of the second embodiment is adapted to indicate which digits of the Animal Registration Number CN have been enlargedly printed as the farm use number FN. Namely, in the ear tag 2 of the second embodiment, there can be visualized those digits of the Animal Registration Number CN which have been enlargedly printed as the farm use number FN, in a certain manner.

Figure 6A:
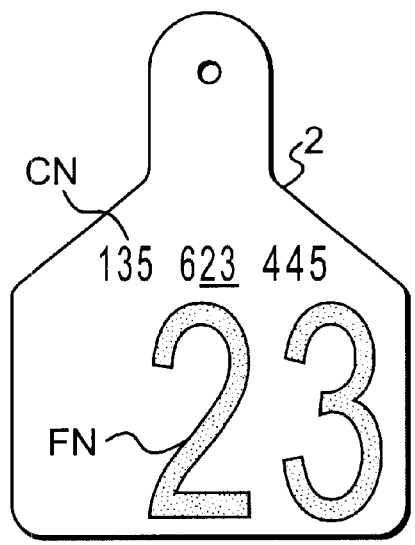
FIG. 6A is a front view of an animal registration ear tag according to a second embodiment of the present invention.

FIG. 6A shows an example where the number "23" enlargedly printed as the farm use number FN is provided by enlargingly printing numerals at the 4th and 5th digits from the lowermost digit of the Animal Registration Number CN "135623445". In this example, it can be visualized that the numerals at the 4th and 5th digits from the lowermost digit of "135623445" have been enlargedly printed, by drawing an underline below the numerals at the 4th and 5th digits to thereby indicate that these numerals have been enlargedly printed.

Figure 6C:
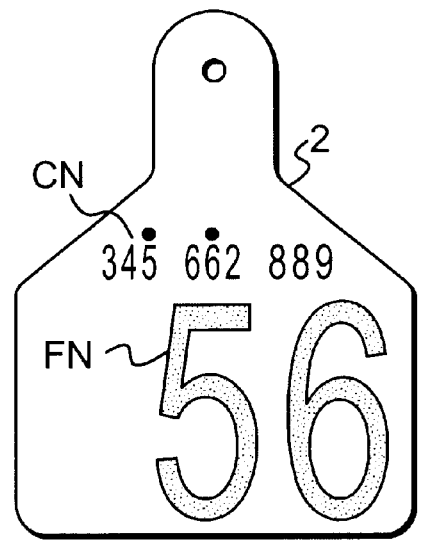
FIGS. 6B through 6D are front views of appearances of animal registration ear tags according to other examples of the second embodiment of the present invention.
Figure 6B:
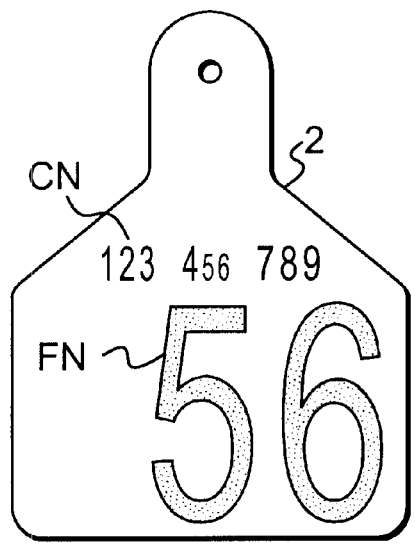

FIG. 6B shows another example where the number "56" enlargedly printed as the farm use number FN is provided by enlargingly printing numerals at the 4th and 5th digits from the lowermost digit of the Animal Registration Number CN "123456789". In this example, it can be seen that the numerals at the 4th and 5th digits from the lowermost digit of "123456789" have been enlargedly printed, by printing the numerals at the 4th and 5th digits from the lowermost digit of the Animal Registration Number CN "123456789" in a size larger than that of the remaining numerals.

In each of the aforementioned examples, those numerals at the successive 2 digits of the Animal Registration Number CN have been enlargedly printed as the farm use number FN. However, those numerals of the farm use number FN to be enlargedly printed as the farm use number FN are not necessarily from two successive digits. FIG. 6C shows an example in such a situation.

FIG. 6C shows a modified example where the number "56" enlargedly printed as the farm use number FN is provided by enlargingly printing numerals at the 3rd and 5th digits from the uppermost digit of the Animal Registration Number CN "345662889". In this example, it can be visualized that the numerals at the 3rd and 5th digits from the uppermost digit of "345662889" have been enlargedly printed, by attaching marks "●" above the numerals at the 3rd and 5th digits from the uppermost digit of the Animal Registration Number CN "345662889".

Figure 6D:
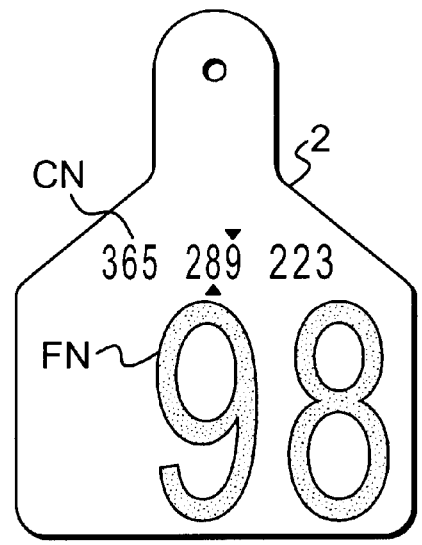

In each of the aforementioned examples where the farm use number FN comprises two or more digits, the numeral at the upper digit in the farm use number FN is also located at the upper digit of the Animal Registration Number CN, and so is the numeral at the lower digit. However, the relationship between the upper digit numeral and the lower digit numeral in the farm use number FN need not correspond to the relationship between the upper digit numeral and the lower digit numeral in the Animal Registration Number CN. The numeral at the upper digit of the farm use number FN can be selected from a lower digit of the Animal Registration Number CN. FIG. 6D shows an example for such a situation.

FIG. 6D shows a modified example where the number "98" enlargedly printed as the farm use number FN is provided by enlargingly printing the numeral "9" at the 4th digit from the lowermost digit of the Animal Registration Number CN "365289223" as the numeral at the upper digit of the farm use number FN, and the numeral "8" at the 5th digit from the lowermost digit of the number CN as the numeral at the lower digit of the number FN. In this example, it can be visualized which numerals of the Animal Registration Number CN have been selected and in what order they have been enlargedly printed, by attaching a mark "▼" above that numeral "9" of the Animal Registration Number CN which numeral has been enlarged as the numeral at the upper digit of the farm use number FN, and a mark "▲" below that numeral "8" of the number CN which numeral has been enlarged as the numeral at the lower digit of the number FN.

Although not shown, it is also possible to attach letters above or below numerals selected as the farm use number FN from the Animal Registration Number CN, to thereby indicate the order or sequence of the selection.

According to the ear tag 2 of the second embodiment, arbitrary digits of the Animal Registration Number CN are enlargedly printed as the farm use number FN. Thus, even when the number of digits of the Animal Registration Number CN is restricted, it is possible to provide many farm use numbers FN within such a restricted number of digits, thereby attaining a high utilization ratio of the Animal Registration Number CN without wastefulness. Further, as described above, the farm use number FN is indicated at the required minimum number of digits in the ear tag 2 according to the second embodiment of the present invention, thereby enabling provision of many farm use numbers FN. This can be never realized by the European systems which enlargingly indicate numerals as the fixed 4 digits.

Figure 7A:
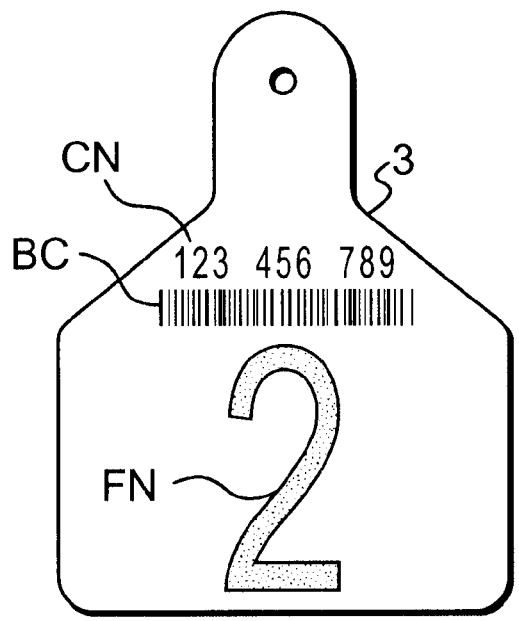
FIG. 7A is a front view of an animal registration ear tag according to a third embodiment of the present invention.
Figure 7B:
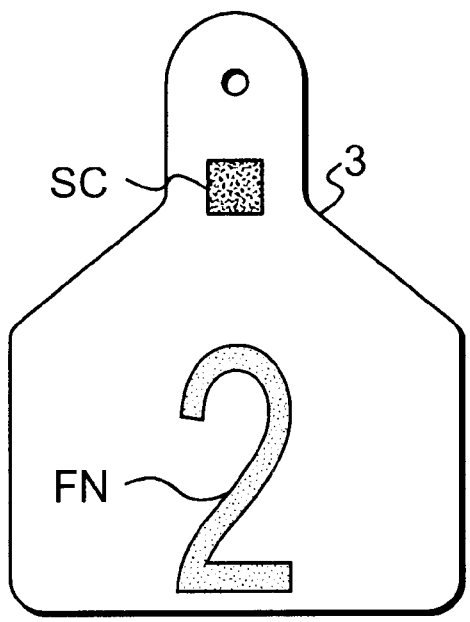
FIG. 7B is a front view of an animal registration ear tag according to another example of the third embodiment of the present invention.

FIG. 7A and FIG. 7B show an animal registration ear tag 3 according to a third embodiment of the present invention, and a modified example thereof, respectively. The animal registration ear tag 3 of the third embodiment is differentiated from the aforementioned two embodiments in that the tag 3 is printed with a barcode BC somewhere on the ear tag 3. The barcode BC may be printed together with the Animal Registration Number CN, or printed alone as the number CN. The farm use number FN in the ear tag 3 of the third embodiment is the same as the aforementioned first and second embodiments.

FIG. 7A shows an example where the barcode BC is printed between the Animal Registration Number CN and the enlargedly printed farm use number FN. By the way, in case of printing the farm use number FN by selecting the last digit(s) of the Animal Registration Number CN, similar to the first embodiment, the barcode BC may simply indicate the Animal Registration Number CN or may include information concerning how many last digits of the number CN have been enlarged. However, as shown in FIG. 7A, where the farm use number FN is printed by selecting an arbitrary digit (the 2nd digit in this example) of the Animal Registration Number CN, the, barcode BC includes information concerning which digit of the number CN has been selected. According to such a method, it becomes possible to readily and externally establish a data correspondence list.

FIG. 7B shows an example where the ear tag 3 carries only the enlargedly printed farm use number CN and the barcode BC, without the Animal Registration Number CN. Note, a two-dimensional barcode SC is used as the barcode BC in this example. This two-dimensional barcode SC is one type of barcode originated from an encryption technique devised by the Israeli military communications. In this example, the two-dimensional barcode SC includes information as to which digit of the Animal Registration Number CN the farm use number FN has been selected from.

Figure 8A:
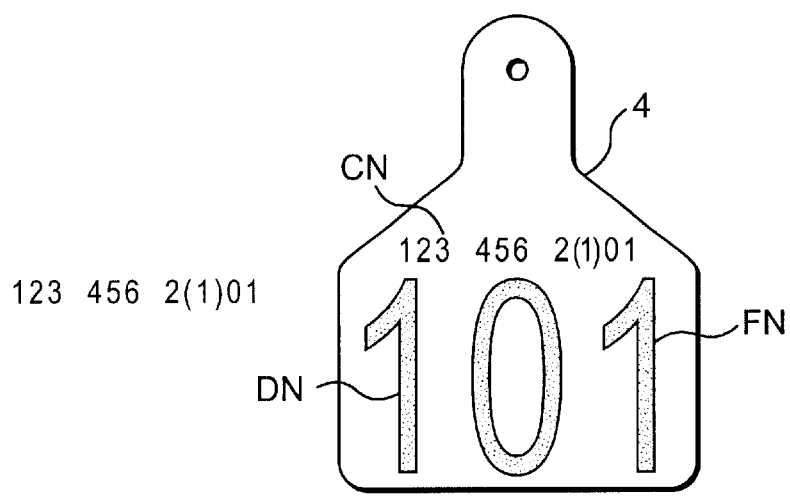
FIG. 8A is a front view of an animal registration ear tag according to a fourth embodiment of the present invention.
Figure 8B:
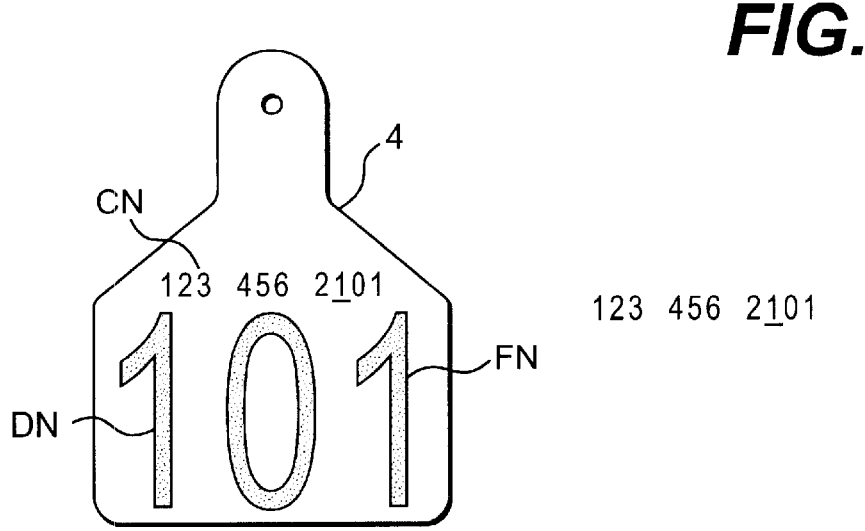
FIGS. 8B and 8C are front views of appearances of animal registration ear tags according to other examples of the fourth embodiment of the present invention.
Figure 8C:
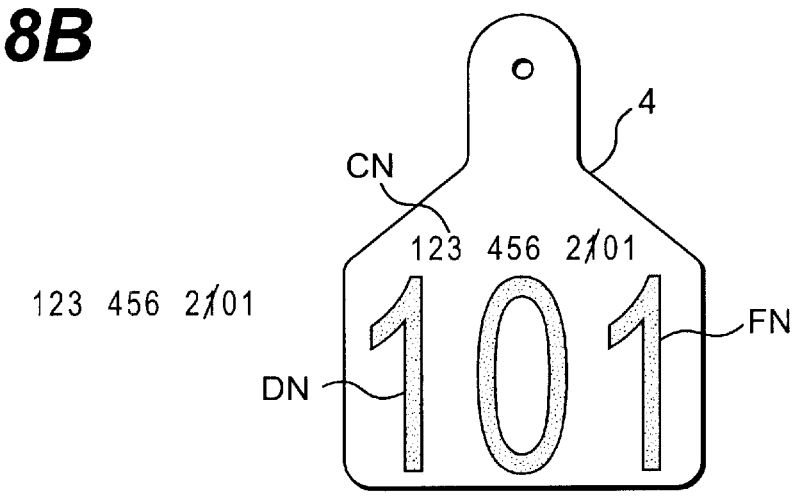

FIGS. 8A through 8C show examples of an animal registration ear tag 4 according to a fourth embodiment of the present invention, respectively. Also the ear tag 4 of the fourth embodiment is basically printed with two rows. This fourth embodiment is differentiated from other embodiments in that: there is inserted a dummy numeral z as a 3rd digit from the lowermost digit of the Animal Registration Number CN when this number CN is "ABC DES GHI", to thereby modify it to "ABC DEF GZHI" and print it. This dummy numeral z has nothing to do with any of numerals included in the Animal Registration Number CN, but provides expediency for farms.

The insertion of the dummy numeral Z into the Animal Registration Number CN is performed in view of demands of many farms for cow management with effective and unique cow numbers with a possibly smaller number of digits. Concretely, typical farms tend to wish to manage animals by farm use numbers such as from "1" to "199" or from "1" to "299". This is because a number having very many digits is too difficult to remember and to view, and there exists a demand for knowing the number of cows being bred.

Under such a situation described just above, it becomes practically impossible to enlargingly print, as the above wished 3-digit number, a farm use number FN having a numeral of "3" or greater at the 3rd digit from the lowermost digit, according to the aforementioned method for selecting the last digits, as they are, from the Animal Registration Number CN such as in the ear tag 1 of the first embodiment. Nonetheless, the fourth embodiment allows to use the Animal Registration Number CN as one of the numbers within the 100's or 200's series even in such a situation where the numeral at the original 3rd digit from the lowermost digit of the number CN is one of numerals "3" to "9", by inserting a dummy numeral DN comprising "1" or "2" into between the original 2nd digit and the original 3rd digit from the lowermost digit of the Animal Registration Number CN. This method improves the effective utilization ratio of an Animal Registration Number CN even in a method for enlargingly printing a farm use number FN by selecting the last digits, as they are, from the Animal Registration Number CN such as in the ear tag 1 of the first embodiment.

FIGS. 8A through 8C show examples exhibiting how the dummy numeral DN is expressed within the Animal Registration Number CN.

FIG. 8A shows an example where the dummy numeral "1" is inserted as a bracketed numeral "(1)" between the original 2nd digit and the original 3rd digit of the Animal Registration Number CN when the numeral "1" at the uppermost digit of the farm use number FN "101" is the dummy numeral. FIG. 8B shows an example where the dummy numeral "1" is inserted as an underlined numeral "1" between the original 2nd digit and the original 3rd digit of the Animal Registration Number CN when the numeral "1" at the uppermost digit of the farm use number FN "101" is the dummy numeral. Lastly, FIG. 8C shows an example where the dummy numeral "1" having a slash superimposed thereon is inserted between the original 2nd digit and the original 3rd digit of the Animal Registration Number CN when the numeral "1" at the uppermost digit of the farm use number FN "101" is the dummy numeral.

Further, the above method to enlargingly print the farm use number FN such as including the inserted dummy numeral DN can be also applied to a situation where numerals constituting a farm use number FN are not fully contained in an Animal Registration Number CN.

According to the above constituted ear tags 1 through 3 of the present invention, farm use numbers FN have been printed at the required minimum number of digits on the ear tags 1 through 4, thereby leaving a free space SP on the left side of the ear tag as compared with conventional ear tags printed with meaningless numeral(s) of "0" at the upper digits of farm use numbers FN. Thus, this free space SP can be arbitrarily utilized by a farm.

Figure 9A:
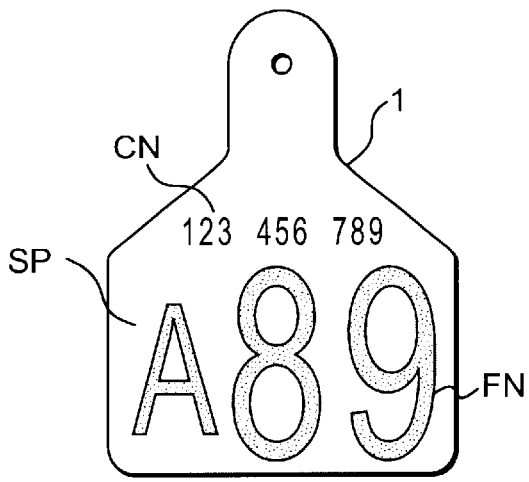
FIGS. 9A and 9B are explanatory views showing a method for differentiating coinciding farm use numbers in animal registration ear tags of the present invention.
Figure 9B:
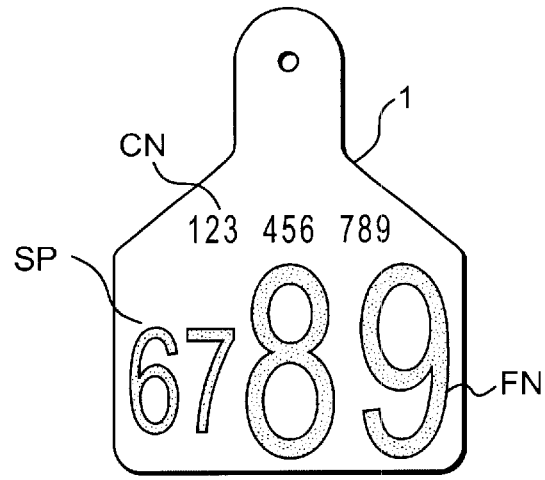
Figure 9C:
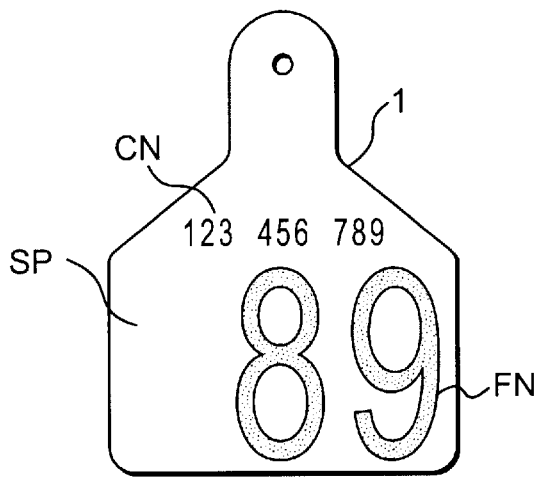
FIGS. 9C and 9D are explanatory views showing two ear tags in a state where Animal Registration Numbers are different from each other but the Animal Registration Numbers according to the present invention have coincided with each other.
Figure 9D:
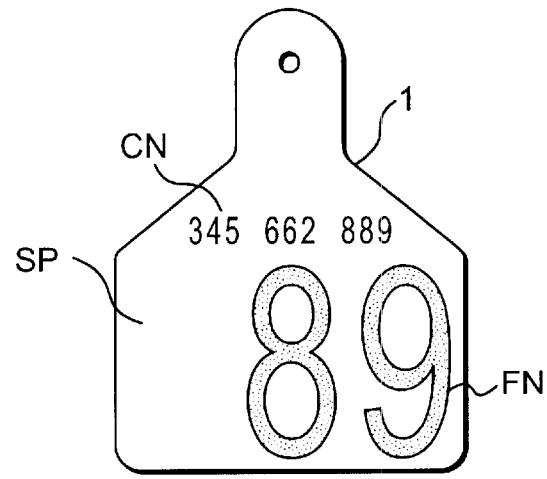

There will be now considered the situation shown in FIG. 9C, where a cow carrying an ear tag carrying an Animal Registration Number CN "123456789" and a farm use number FN "89" is transferred from a farm to another receiving farm, and where this receiving farm possesses a cow carrying an ear tag carrying an Animal Registration Number CN "345662889" and a farm use number FN "89". This situation leads to duplication of the farm use numbers FN at the receiving farm, since the animal registration ear tags are basically unexchangeable.

Even in such a situation, there can be avoided the duplication of the farm use numbers FN at the receiving farm, by entering a suitable letter and/or numeral in the free space SP before the farm use number FN of the ear tag of the transferred cow (or the cow originally possessed by the receiving farm). Such a suitable letter and/or numeral may be manually written or drawn/painted by a specific machine. FIG. 9A shows an example where a certain letter is entered in the free space SP before the farm use number FN, while FIG. 9B shows an example where numerals at 2 digits upper than the current farm use number FN are entered in the free space SP before the number FN.

Although not shown herein, it is also possible to delete a part of a farm use number FN by hand or by a specific machine, as another method for overcoming duplication of farm use numbers FN.

Figure 10A:
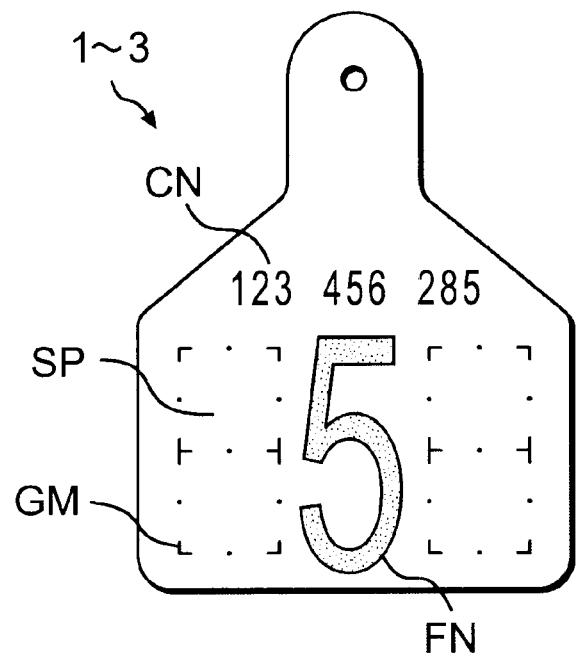
FIGS. 10A and 10B are front views of appearances of modified examples of the animal registration ear tags according to the first through third embodiments of the present invention.
Figure 10B:
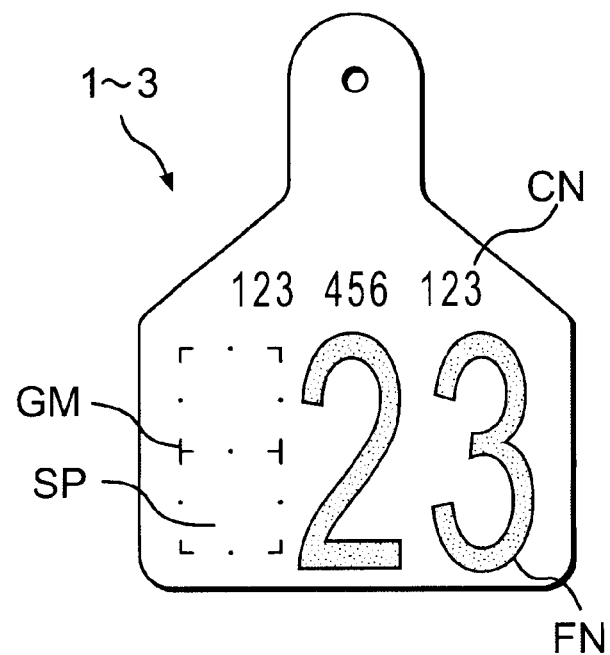

Moreover, when a farm use number FN to be printed on each of the ear tags 1 through 3 includes only one digit as shown in FIG. 10A, it is possible to print the farm use number FN of one digit at the center of each of ear tag 1 through 3 to thereby provide free spaces SP at both sides of the number FN. Further, as shown in FIGS. 10A and 10B, it is also possible to print a guide mark(s) GM in the free space SP, for guiding to thereby promote an entry (or entries) such as of letter(s) and/or numeral(s) into the free space(s) SP. As shown, this guide mark GM may be a blank digital numeral (s) formed of 7 segmental bars in the free space SP, such that a desired numeral is indicated or formed by painting out suitable segmental bars.

Figure 11:
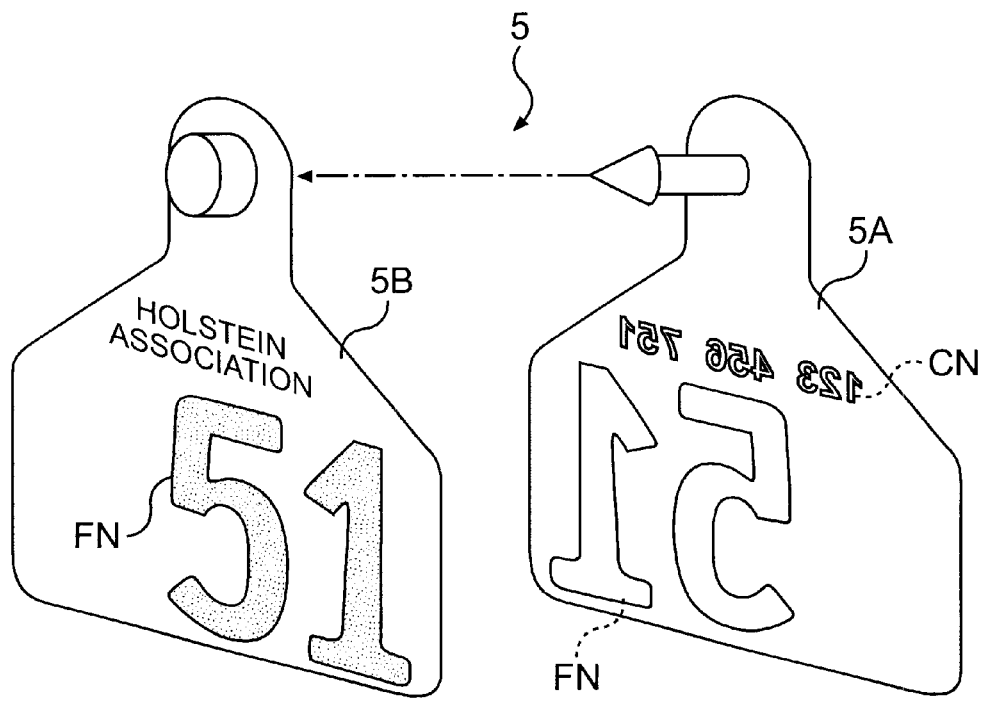
FIG. 11 is an assembling perspective view showing an animal registration ear tag according to a fifth embodiment of the present invention.

FIG. 11 shows a fifth embodiment ox the present invention, i.e., shows an example in which the present invention is applied to an ear tag 5 of such a type that male and female ear tags 5A, 5B are combinedly attached to a cow. In the ear tag 5 of this embodiment, the male ear tag 5A has a front surface printed with an Animal Registration Number CN and a farm use number FN, this number FN being provided by enlargingly printing the last 2 digits of the number CN, while the female ear tag 53 has a front surface enlargedly printed with the farm use number FN. It is possible to additionally print a name of a registering organization or a trademark on the front surface of the female ear tag 5B.

Figure 12:
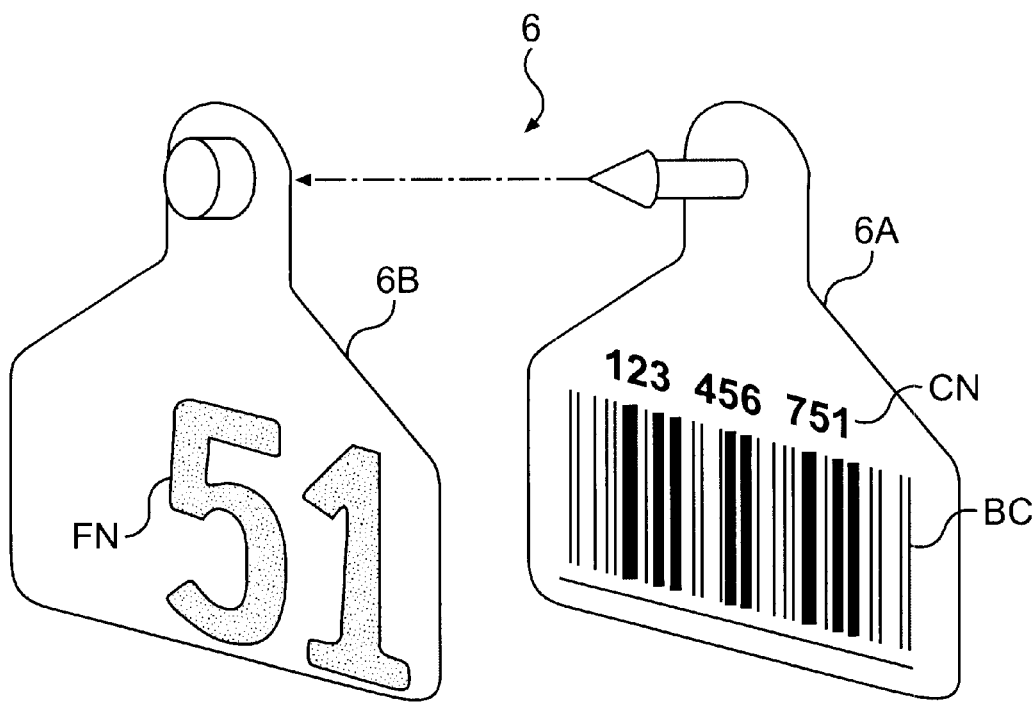
FIG. 12 is an assembling perspective view showing an animal registration ear tag according to a sixth embodiment of the present invention.

FIG. 12 shows a sixth embodiment of the present invention, i.e., shows an example in which the present invention is applied to an ear tag 6 of another type such that male and female ear tags 6A, 6B are combinedly attached to a cow. In the ear tag 6 of this embodiment, the male ear tag 6A has a back surface printed with an Animal Registration Number CN and a barcode BC corresponding thereto, while the female ear tag 6B has a front surface enlargedly printed with a farm use number FN. In this embodiment, the barcode BC to be rarely used is printed on the rear surface of the male ear tag 5A. In this case, since the barcode BC can be printed in a larger size on the rear surface of the male ear tag 5A and positioned inwardly of a cow ear, the barcode BC is scarcely damaged by rubbing or contamination, thereby improving its readability.

Figure 13:
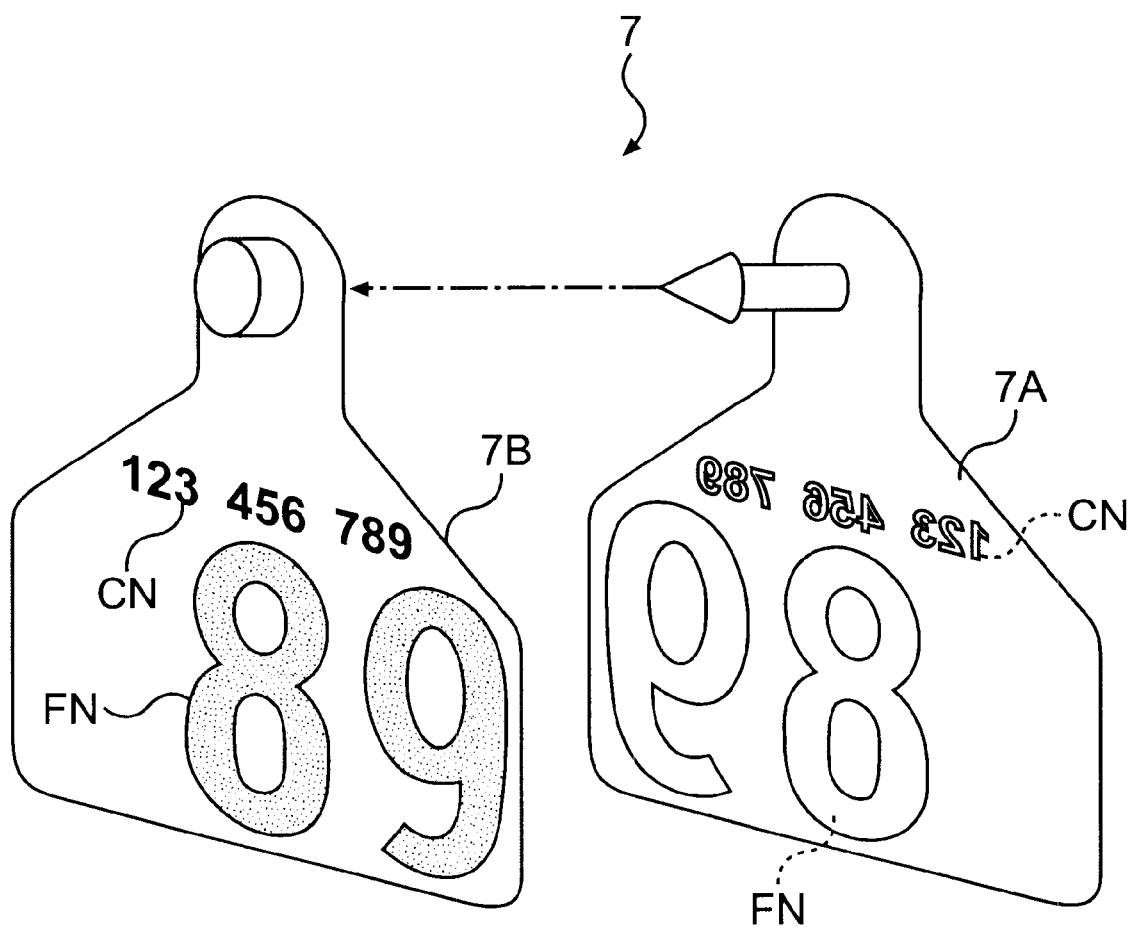
FIG. 13 is an assembling perspective view showing an animal registration ear tag according to a seventh embodiment of the present invention.

FIG. 13 shows a seventh embodiment of the present invention, i.e., shows a most common example in which the present invention is applied to an ear tag 7 of such a type that male and female ear tags 7A, 73 are combinedly attached to a cow. In the ear tag 7 of this embodiment, the male ear tag 7A has a front surface printed with an Animal Registration Number CN and a farm use number FN, while the female ear tag 7B has a front surface also printed with the Animal Registration Number CN and the farm use number FN. Although not shown, this type of ear tag 7 is normally accompanied by a barcode for entry, such as by a tie-on label, a hanging label, or a piece of cardboard. These means may be regarded as being a passport indicating an individual information of an animal, and may act as auxiliary entry means.

FIG. 14 and FIG. 15 show eighth and ninth embodiments of the present invention, respectively, i.e., show embodiments where the present invention is applied to each of one-piece type ear tags 8 and 9. FIG. 14 shows the embodiment of the ear tag 8 having a front surface printed with an farm use number FN and a two-dimensional barcode SC, and FIG. 15 shows the embodiment of the ear tag 9 having a front surface printed with a farm use number FN and a barcode BC.

FIGS. 16A and 16B show a 10th embodiment of the present invention, and show front and rear surfaces of a one-piece type ear tag 10, respectively. As shown in FIG. 16A, the front surface of the ear tag 10 is printed with a farm use number FN, and the ear tag 10 has an edge portion printed with years Y and months M. Further, as shown in FIG. 16B, the ear tag 10 has a rear surface printed with a farm use number FN and a barcode BC corresponding thereto. In this embodiment, it is possible to render the ear tag 10 to be informative such as by marking with a pen or by cutting out those year and month portions where a cow was born.

In the above described 1st through 10th embodiments, the farm use numbers FN have been printed by numerals excluding prefixed "0('s)" thereof (at a digit(s) before or upper than the uppermost meaningful numeral). For example, when numbers from "1" to "99" of one digit or two digits are required as farm use numbers FN, the ear tags 1 are simply printed with meaningful numerals such as from "1" to "99" without printing meaningless numeral "0('s)" which have been otherwise prefixed in Europe such as in a manner from "0001" to "0099". The above feature of the present invention is to improve the visibility of farm use numbers FN.

On the other hand, a meaningless numeral "0('s)" printed before a farm use number FN of one digit or two digits will not deteriorate visibility so much, when farm use numbers FN being used in a certain farm have 3 digits at the maximum. Further, there may be such a situation that: a meaningless numeral "0('s)" is/are preferred such as when a farm use number FN is scanned by a hand-held terminal to thereby individually identify a cow, or when mistakes of manual input are to be avoided; and a farm side has requested an ear tag in such a form that a meaningless numeral "0('s)" has/have been printed before a number of one digit or two digits. Thus, there will be described examples of ear tags printed with a meaningless numeral "0('s)" before farm use numbers FN of one digit or two digits, in the following embodiments.

In manufacturing ear tags printed with a meaningless numeral "0('s)" before farm use numbers FN of one digit or two digits, there can be attained universality of the number of digits of farm use numbers FN, by selecting the allowed number of meaningless "0" to be at the most 1 (one) where the maximum number of digits in a farm using ear tags is two, and by selecting the allowed number of meaningless "1's" to be at the most 2 (two) where the maximum number of digits in a farm using ear tags is three.

Figure 17A:
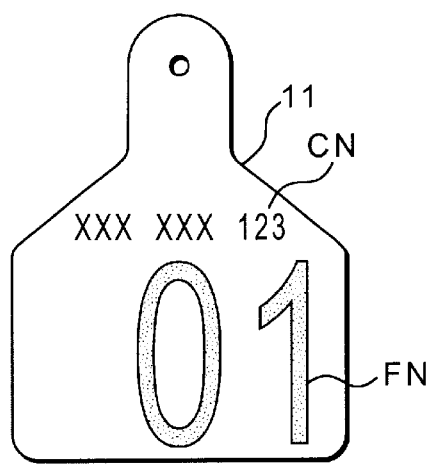
FIG. 17A is a front view of an animal registration ear tag according to an 11th embodiment of the present invention.
Figure 17D:
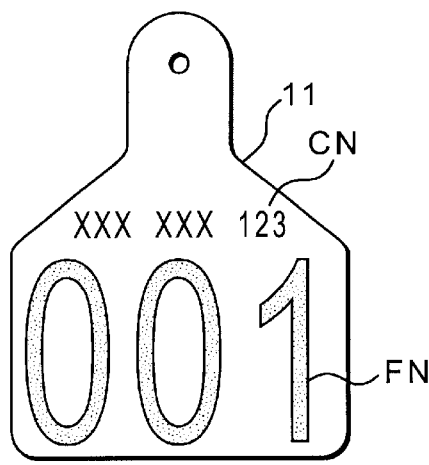
FIGS. 17B through 17f are front views of animal registration ear tags according to other examples of the 11th embodiment of the present invention.
Figure 17B:
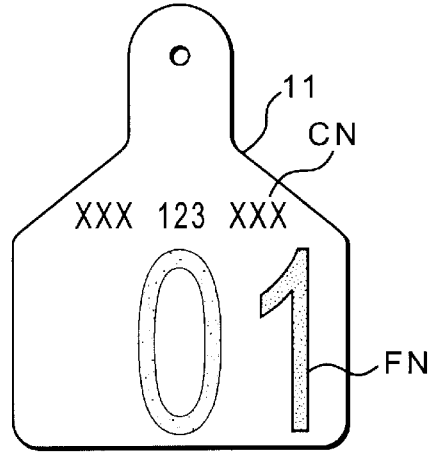
Figure 17E:
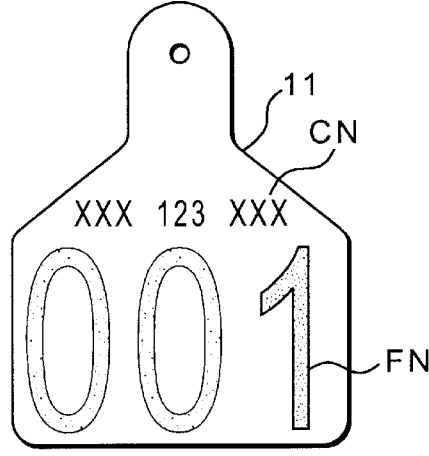
Figure 17C:
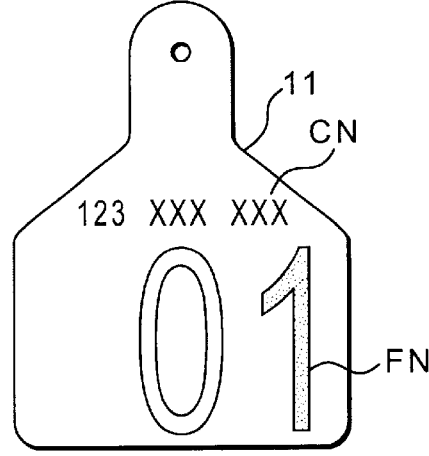
Figure 17F:
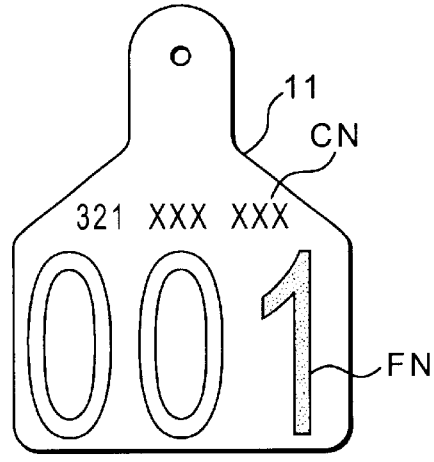
Figure 18A:
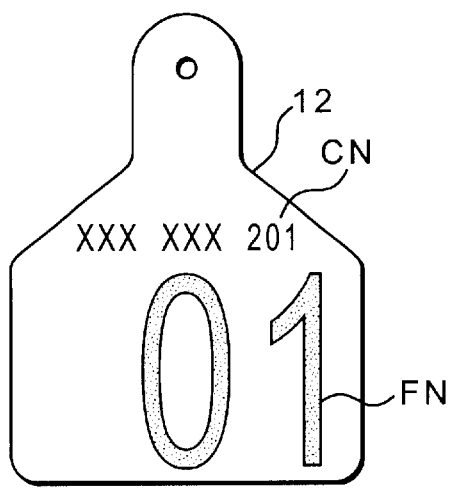
FIG. 18A is a front view of an animal registration ear tag according to a 12th embodiment of the present invention.
Figure 18D:
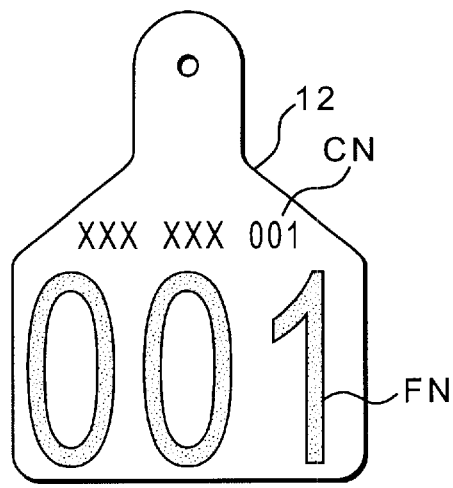
FIGS. 18B through 18F are front views of animal registration ear tags according to other examples of the 12th embodiment of the present invention.
Figure 18B:
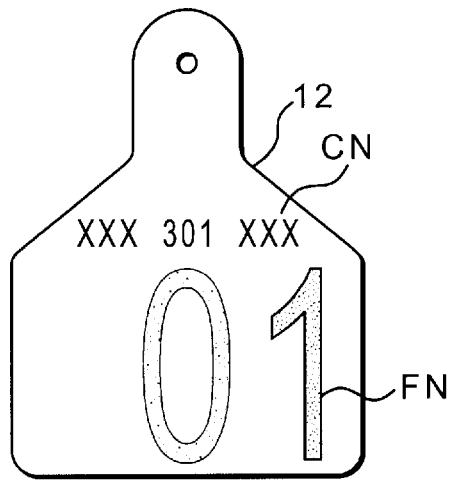
Figure 18E:
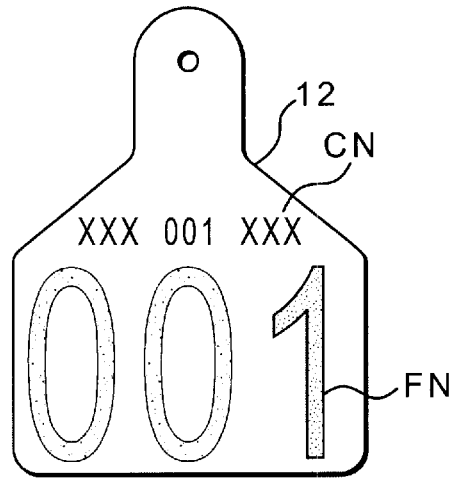
Figure 18C:
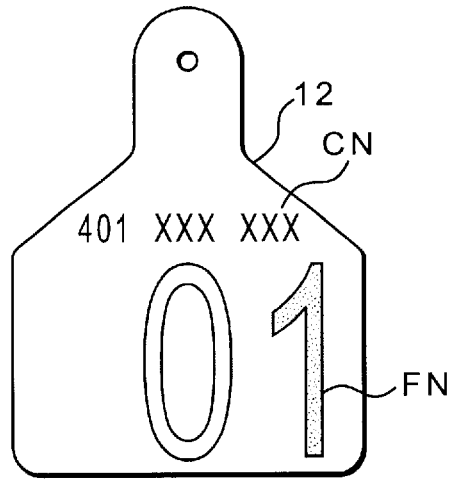
Figure 18F:
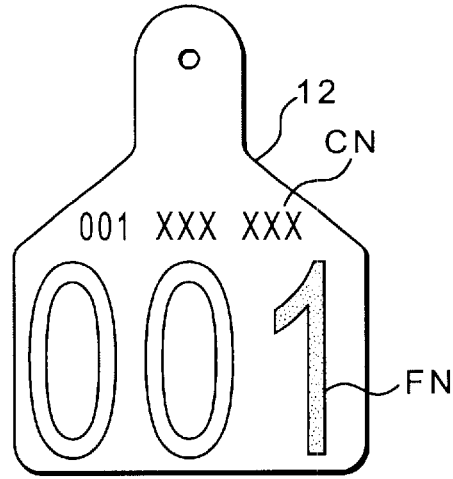

FIGS. 17A through 17F show examples of an ear tag 11 according to a 11th embodiment of the present invention. FIGS. 17A through 17C show examples where the maximum number of digits is two in a farm using this ear tag 11, while FIGS. 17D through 17F show examples where the maximum number of digits is three in a farm using this ear tag 11.

The example shown in FIG. 17A corresponds to a situation where the farm use number FN has a meaningful numeral "0" and where only this numeral "1" is included at the 3rd digit from the lowermost digit of an Animal Registration Number CN. In this example, there is printed only one meaningless numeral "0" before the meaningful numeral "1" of the farm use number FN, and it is in the same size and at the same print-density or color as the meaningful numeral "1".

FIG. 17B shows a modified example of FIG. 17A, and this example corresponds to a situation where the meaningful numeral of the farm use number FN is also "1" and only this numeral "1" is included at the 4th digit from the uppermost digit of an Animal Registration Number CN, In this example, there is printed only one meaningless numeral "0" before the meaningful numeral It of the farm use number FN and it is in the same size as the meaningful numeral "1" but at a lower print-density. By printing the numeral "0" at a lower print-density, the meaningful numeral "1" can be clearly confirmed.

FIG. 17C shows another modified example of FIG. 17A, and this example corresponds to a situation where the meaningful numeral of the farm use number FN is also "1" and only this numeral "1" is included at the uppermost digit of an Animal Registration Number CN. In this example, there is printed only one meaningless numeral "0" before the meaningful numeral "1" of the farm use number FN, and in the same size as the meaningful numeral "1" but as an outline or whitened character. By printing the numeral "0" as an outline character, the meaningful numeral "1" can be clearly confirmed in contrast to the meaningless "0".

FIG. 17D shows a modified example corresponding to a situation where the farm use number FN has a meaningful numeral "1" and where only this numeral "1" is included at the 3rd digit from the lowermost digit of an Animal Registration Number CN. In this example, there are printed two meaningless numerals "0" before the meaningful numeral "1" of the farm use number FN, and in the same size and at the same print-density as the meaningful numeral "1".

FIG. 17E shows a modified example of FIG. 17D, and this example corresponds to a situation where the meaningful numeral of the farm use number FN is also "1" and only this numeral "1" is included at the 4th digit from the uppermost digit of an Animal Registration Number CN. In this example, there are printed two meaningless numerals "0" before the meaningful numeral "1" of the farm use number FN, in the same size as the meaningful numeral "1" but at a lower print-density.

FIG. 17F shows another modified example of FIG. 17D, and this example corresponds to a situation where the meaningful numeral of the farm use number FN is also "1" and only this numeral "1" is included at the 3rd digit from the uppermost digit of an Animal Registration Number CN. In this example, there are printed two meaningless numerals "0" before the meaningful numeral "1" of the farm use number FN, in the same size as the meaningful numeral "1" but as outline characters.

FIGS. 18A through 18F show examples of an ear tag 12 according to a 12th embodiment of the present invention, in which the methods for printing farm use numbers FN are exactly identical with those in examples depicted in FIGS. 17A through 17F, and FIGS. 18A through 18F correspond to FIGS. 17A through 17F, respectively. The ear tag 12 of the 12th embodiment is differentiated from the ear tag 11 of the 11th embodiment, only in that: in addition to the inclusion of the meaningful numeral "1" of a farm use number FN in an Animal Registration Number CN; that(those) numeral(s) "0" in the farm use number FN, which has(have) been meaningless in the 11th embodiment, is (are) also included in the Animal Registration Number CN at a digit(s) upper (=more significant) than the meaningful numeral "1" included in the numeral CN. In this way, when one "0" or two consecutive "0"s (i.e., "00") is/are included in an Animal Registration Number CN at a digit/digits of the number CN before a numeral(s) to be enlargedly printed as a farm use number FN, it becomes possible to establish the farm use number FN including such numeral "0" or numerals "00" at a suitable upper digit(s) by printing the included "0" or "00", as it/they is/are at the same print-density or a thinner print-density, or as an outline character(s).

Figure 19A:
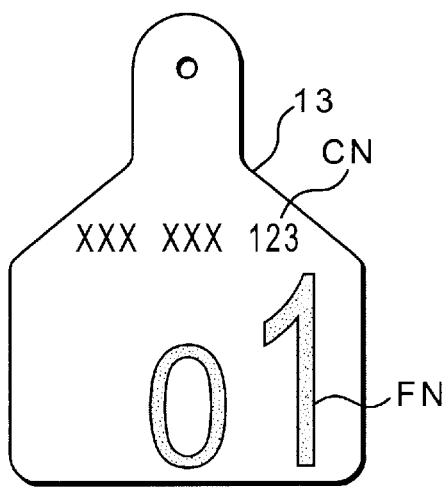
FIG. 19A is a front view of an animal registration ear tag according to a 13th embodiment of the present invention.
Figure 19D:
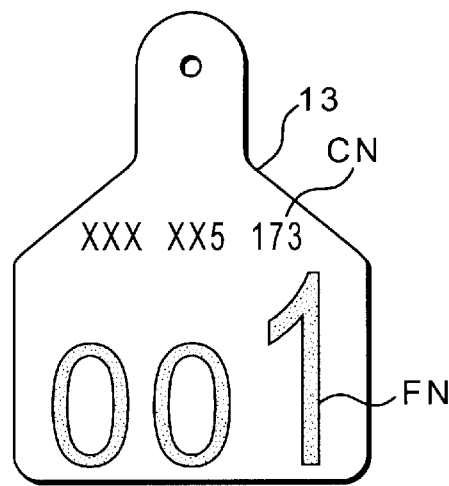
FIGS. 19B through 19F are front views of animal registration ear tags according to other examples of he 13th embodiment of the present invention.
Figure 19B:
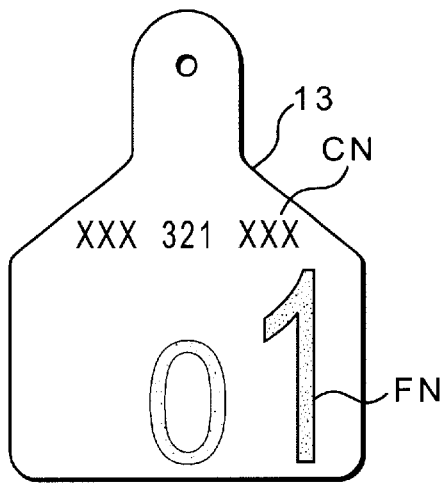
Figure 19E:
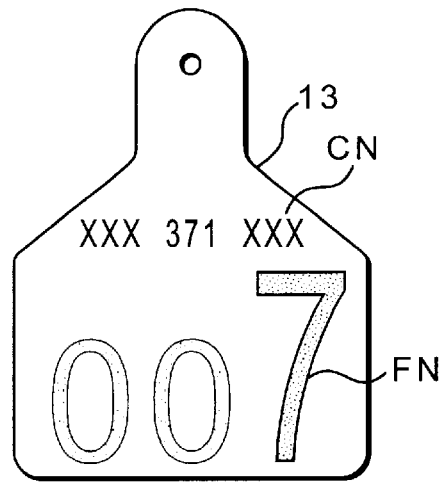
Figure 19C:
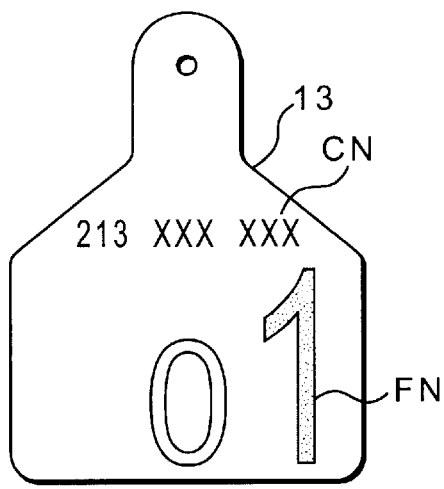
Figure 19F:
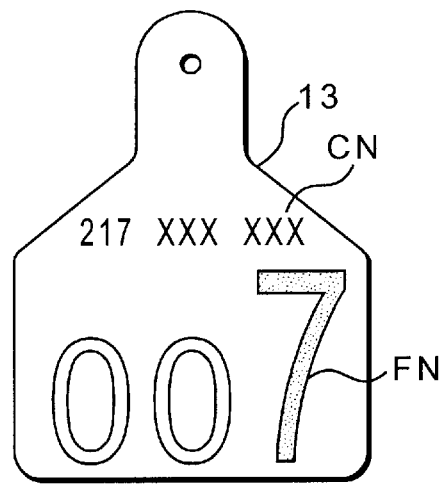
Figure 20A:
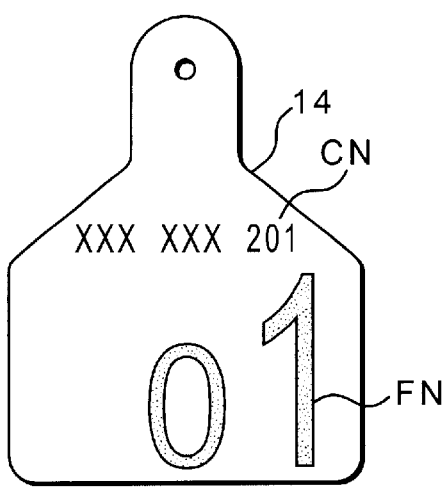
FIG. 20A is a front view of an animal registration ear tag according to a 14th embodiment of the present invention.
Figure 20D:
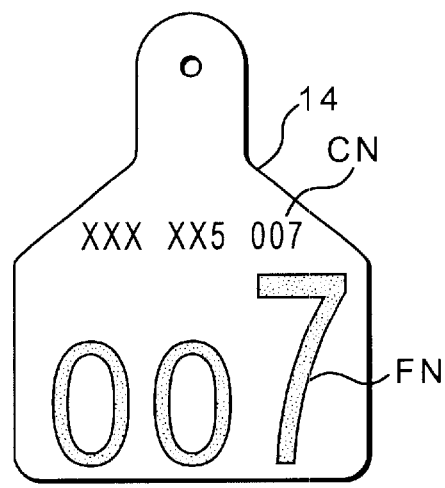
FIGS. 20B through 20F are front views of animal registration ear tags according to other examples of the 14th embodiment of the present invention.
Figure 20B:
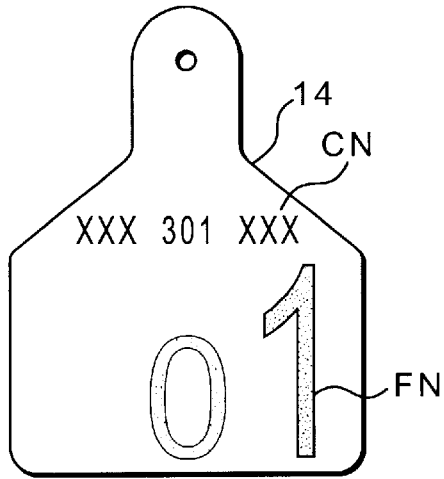
Figure 20E:
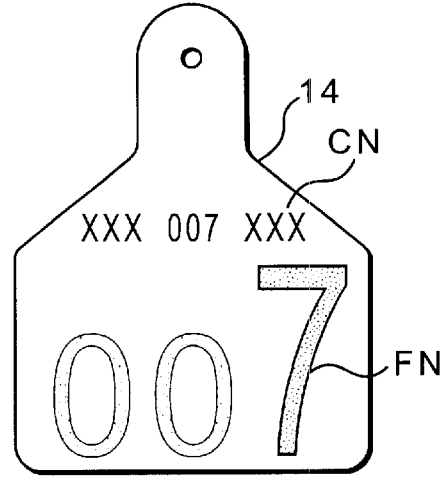
Figure 20C:
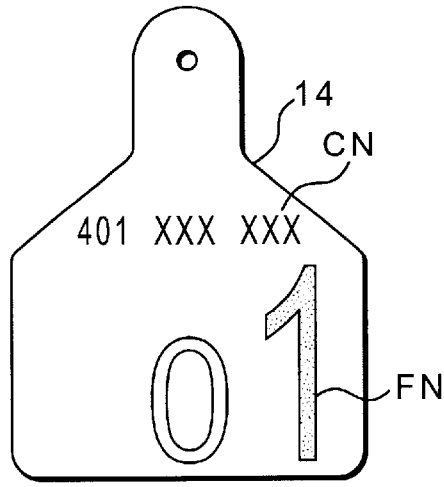
Figure 20F:
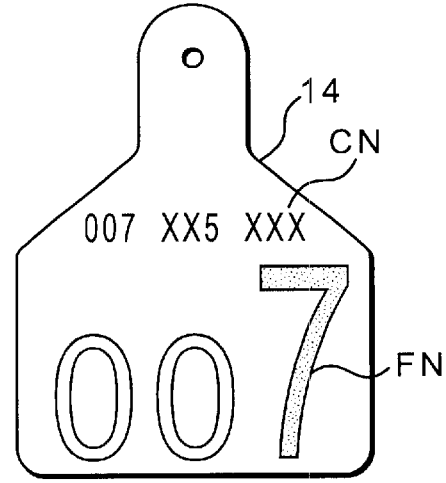

FIGS. 19A through 19F show examples of an ear tag 13 according to a 13th embodiment of the present invention. FIGS. 19A through 19C show examples where the maximum number of digits is two on a farm using this ear tag 13, while FIGS. 19D through 19F show examples where the maximum number of digits is three on a farm using this ear tag 13.

The example shown in FIG. 19A corresponds to a situation where the farm use number FN has a meaningful numeral "1" and where only this numeral "1" is included at the 3rd digit from the lowermost digit of an Animal Registration Number CN. In this example, there is printed only one meaningless numeral "0" before the meaningful numeral "1" of the farm use number FN, in a size smaller than, and at the same print-density as, the meaningful numeral "1".

FIG. 19B shows a modified example of FIG. 19A, and this example corresponds to a situation where the meaningful numeral of the farm use number FN is also "1" and only this numeral "1" is included at the 4th digit from the lowermost digit of an Animal Registration Number CN. In this example, there is printed only one meaningless numeral "0" before the meaningful numeral "1" of the farm use number FN, and in a size smaller than and at a lower print-density than the meaningful numeral "1".

FIG. 19C shows another modified example of FIG. 19A, and this example corresponds to a situation where the meaningful numeral of the farm use number FN is also "1" and only this numeral "1" is included at the 2nd digit from the uppermost digit of an Animal Registration Number CN. In this example, there is printed only one meaningless numeral "0" before the meaningful numeral "1" of the farm use number FN, in a size smaller than the meaningful numeral "1" and as an outline character.

FIG. 19D shows an example corresponding to a situation where the farm use number FN has a meaningful numeral "1" and where only this numeral "1" is included at the 3rd digit from the lowermost digit of an Animal Registration Number CN. In this example, there are printed two meaningless numerals "0" before the meaningful numeral "1" of the farm use number FN, in a size smaller than, and at the same print-density as, the meaningful numeral "1".

FIG. 19E shows a modified example of FIG. 19D, and this example corresponds to a situation where the meaningful numeral of the farm use number FN is "7" and only this numeral "7" is included at the 5th digit from the lowermost digit of an Animal Registration Number CN. In this example, there are printed two meaningless numerals "0" before the meaningful numeral "7" of the farm use number FN, in a size smaller than the meaningful numeral "7" and at a lower print-density.

FIG. 19F shows another modified example of FIG. 19D, and this example corresponds to a situation where the meaningful numeral of the farm use number FN is "7". and only this numeral "7" is included at the 3rd digit from the uppermost digit of an Animal Registration Number CN. In this example, there are printed two meaningless numerals "0" before the meaningful numeral ("7" of the farm use number FN, in a size smaller than the meaningful numeral "7" and as outline characters.

FIGS. 20A through 20F show examples of an ear tag 14 according to a 14th embodiment of the present invention, in which the methods for printing farm use numbers FN are exactly identical with those in examples depicted in FIGS. 19A through 19F, and FIGS. 20A through 20F correspond to FIGS. 19A through 19F, respectively (in FIG. 19D only, the meaningful numeral has been changed from "1" to "7"). The ear tag 14 of the 14th embodiment is differentiated from the ear tag 13 of the 13th embodiment only in that: in addition to the inclusion of the meaningful numeral "1" or "7" of a farm use number FN in an Animal Registration Number CN; that(those) numeral(s) "0" in the farm use number FN, which has(have) been meaningless in the 13th embodiment, is(are) also included in the Animal Registration Number CN at a digit(s) upper than the meaningful numeral "1" or "7" included in the numeral CN. In this way, when one "0" or two consecutive "0"s (i.e., "00") is/are included in an Animal Registration Number CN at a digit/digits of the number CN before a numeral(s) to be enlargedly printed as a farm use number FN, it becomes possible to establish the farm use number FN including such numeral "0" or numerals "00" at a suitable upper digit(s) by printing, in a smaller size, the included "0" or "00" at the same print-density or a thinner print-density, or as an outline character(s).

FIGS. 21A through 21F show examples of an ear tag 15 according to a 15th embodiment of the present invention, where the maximum number of digits is three in a farm using this ear tag 15 in which a farm use number FN has 2 digits.

Figure 21A:
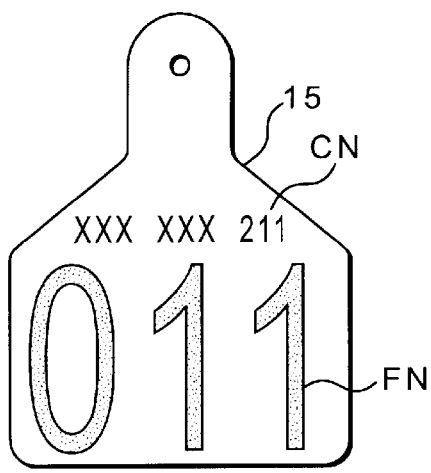
FIG. 21A is a front view of an animal registration ear tag according to a 15th embodiment of the present invention.

The example shown in FIG. 21A corresponds to a situation where the farm use number FN has meaningful numerals "11" and where only these numerals "11", are included at the 1st (i.e., lowermost itself) and 2nd digits from the lowermost digit of an Animal Registration Number CN. In this example, there is printed only one meaningless numeral "0" before the meaningful numerals "11" of the farm use number FN, and in the same size and at the same print-density as the meaningful numerals "11".

Figure 21D:
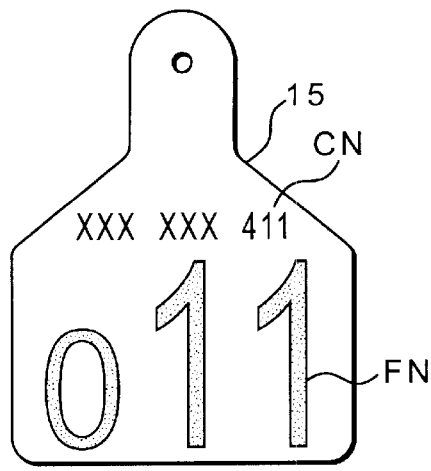
FIGS. 21B through 21F are front views of animal registration ear tags according to other examples of the 15th embodiment of the present invention.
Figure 21B:
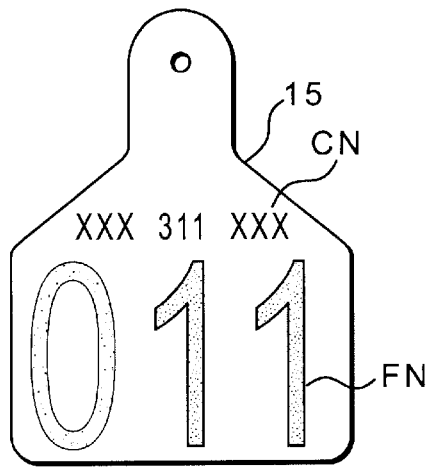

FIG. 21B shows a modified example of FIG. 21A, and this example corresponds to a situation where the meaningful numerals of the farm use number FN are also "11" and only these numerals "11" are included at the 4th and 5th digits from the lowermost digit of an Animal Registration Number CN. In this example, there is printed only one meaningless numeral "0" before the meaningful numerals "11" of the farm use number FN, in the same size as the meaningful numerals "11" but at a lower print-density.

Figure 21E:
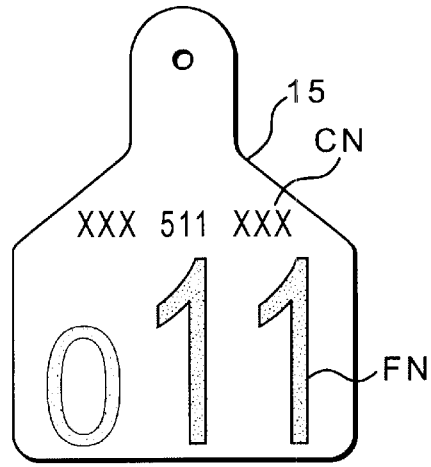
Figure 21C:
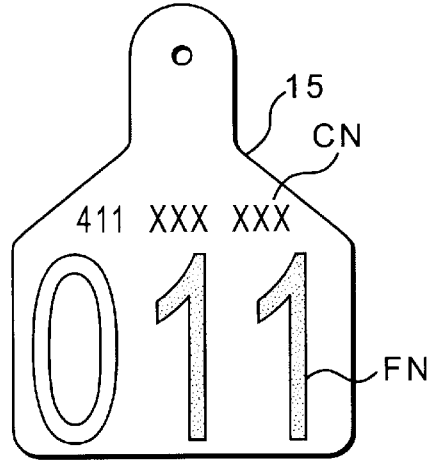

FIG. 21C shows another modified example of FIG. 21A, and this example corresponds to a situation where the meaningful numerals of the farm use number FN are also "11" and only these numerals "11" are included at the 2nd and 3rd digits from the uppermost digit of an Animal Registration Number CN. In this example, there is printed only one meaningless numeral "0" before the meaningful numerals "11" of the farm use number FN, in the same size as the meaningful numerals "11" but as an outline character.

FIG. 21D shows a modified example corresponding to a situation where the farm use number FN has meaningful numerals "11" and where only these numerals "11" are included at the 1st and 2nd digits from the lowermost digit of an Animal Registration Number CN. In this example, there is printed one meaningless numeral "0" before the meaningful numerals "11" of the farm use number FN, in a size smaller than but at the same print-density as the meaningful numerals "11".

FIG. 21E shows a modified example of FIG. 21D, and this example corresponds to a situation where the meaningful numerals of the farm use number FN are also "11" and only these numerals "11" are included at the 4th and 5th digits from the lowermost digit of an Animal Registration Number CN. In this example, there is printed one meaningless numeral "0" before the meaningful numerals "11" of the farm use number FN, in a size smaller than the meaningful numerals "11" and at a lower print-density.

Figure 21F:
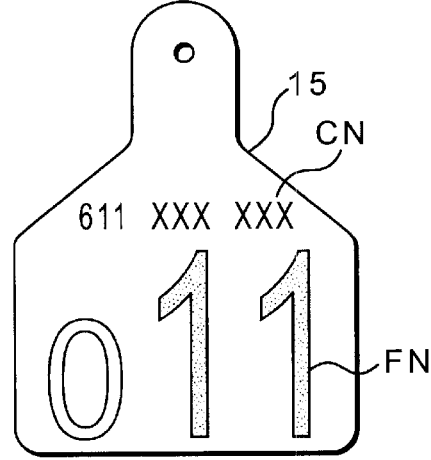
Figure 22A:
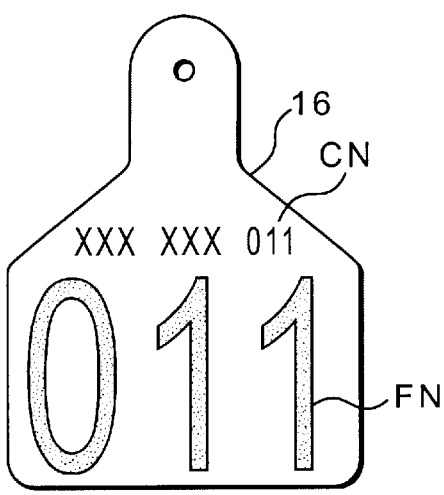
FIG. 22A is a front view of an animal registration ear tag according to a 16th embodiment of the present invention.
Figure 22D:
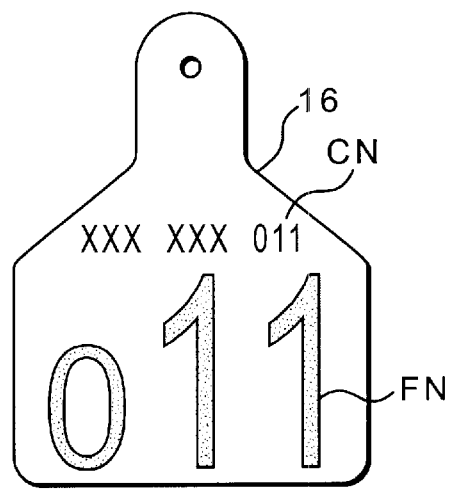
FIGS. 22B through 22F are front views of animal registration ear tags according to other examples of the 16th embodiment of the present invention.
Figure 22B:
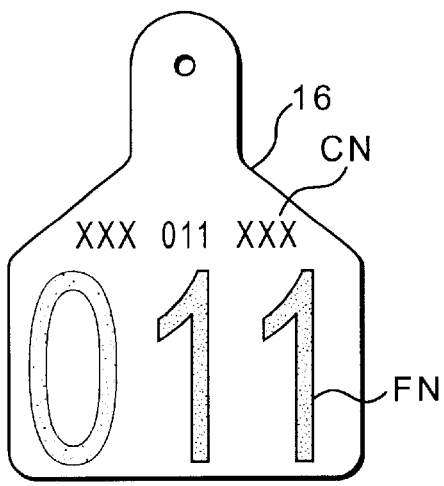
Figure 22E:
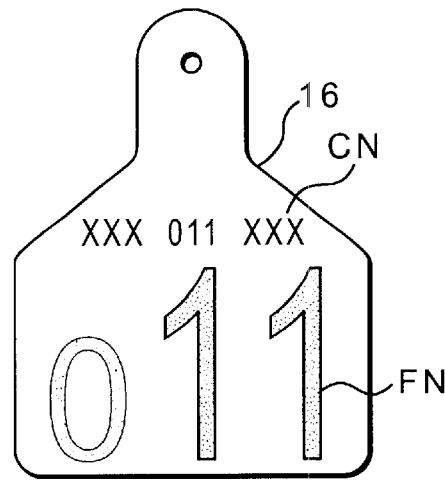
Figure 22C:
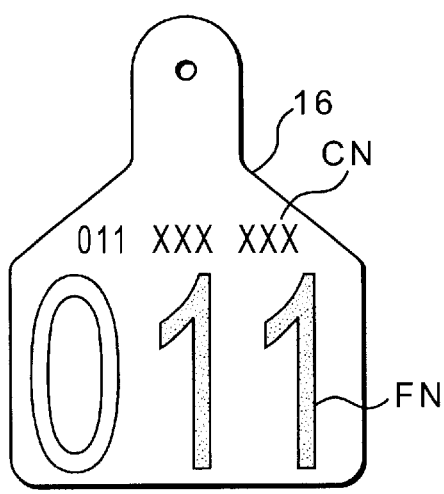
Figure 22F:
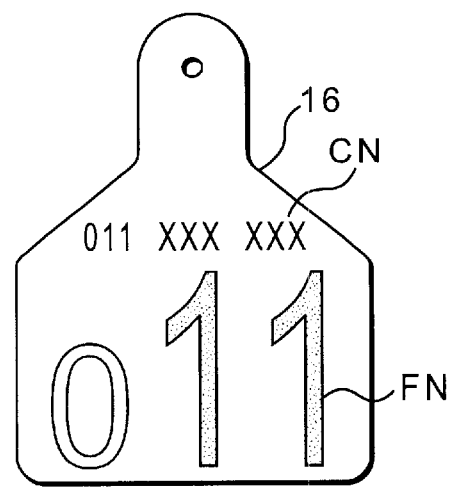

FIG. 21F shows another modified example of FIG. 21D, and this example corresponds to a situation where the meaningful numerals of the farm use number FN are also "11" and only these numerals "11" are included at the 2nd and 3rd digits from the uppermost digit of an Animal Registration Number CN. In this example, there is printed one meaningless numeral "0" before the meaningful numerals "11" of the farm use number FN, in a size smaller than the meaningful numerals "11" and as an outline character.

FIGS. 22A through 22F show examples of an ear tag 16 according to a 16th embodiment of the present invention, in which the methods for printing farm use numbers FN are exactly identical with those in examples depicted in FIGS. 21A through 21F, and FIGS. 22A through 22F correspond to FIGS. 21A through 21F, respectively. The ear tag 16 of the 16th embodiment is differentiated from the ear tag 15 of the 15th embodiment only in that: in addition to the inclusion of the meaningful numerals "11" of a farm use number FN in an Animal Registration Number CN; that numeral "0" in the farm use number FN, which has been meaningless in the 15th embodiment, is also included in the Animal Registration Number CN at a digit upper than the meaningful numerals "11" included in the numeral CN. In this way, when one "0" is included in an Animal Registration Number CN at a digit of the number CN before numerals to be enlargedly printed as a farm use number FN, it becomes possible to establish the farm use number FN including such a numeral "0" at an upper digit of the meaningful numerals by printing the included "0", in the same size as or in a size smaller than the meaningful numerals, at the same print-density or a thinner print-density, or as an outline character.

There will be now described a procedure or method for a farm to obtain farm use numbers FN, i.e., a method to print numbers desired or required by the farm on ear tags, in the aforementioned method for managing animals by utilizing ear tags printed with both of Animal Registration Numbers CN and farm use numbers FN, respectively.

There will be firstly described a printing method for ear tags, in which: Animal Registration Numbers CN to be printed on ear tags are managed by a predetermined administrative department; ear tag issuing organizations (factories of ear tags) are established separately from the administrative department; and farms are to inform their desired farm use numbers FN directly to the administrative department when the farms are to obtain the numbers FN, and then ear tags are printed by a pertinent issuing organization and distributed to the farms.

In this situation, a pertinent farm informs the administrative department of the procuration or acquisition request of the farm for ear tags printed with farm use numbers as arbitrary farm-use individual identification numbers, such as farm use numbers FN from "1" to "40", required for individually identifying animals in the pertinent farm. In this case, the administrative department is preferably prepared to accept or admit farm use numbers FN having maximum number of digits up to 4 digits to give leeway, though the maximum number of digits of farm use numbers FN will be actually up to 3 digits in view of the scales of respective farms.

Upon request for farm use numbers FN from a farm, the administrative department is to retrieve Animal Registration Numbers CN including all the numerals at respective digits of the requested farm use numbers FN, respectively, from a computer installed in the administrative department. The computer is to include therein a database of available Animal Registration Numbers, and the administrative department is to retrieve available Animal Registration Numbers CN from this database. There are various ways to select Animal Registration Numbers CN, depending on whether farm use numbers FN are selected from a last digit(s) of an Animal Registration Number CN like the aforementioned first embodiment or from intermediate digits from an Animal Registration Number CN like the aforementioned second embodiment. For example, it is possible to select a farm use number FN from a last digit(s) of an Animal Registration Number CN like the aforementioned first embodiment at an earlier stage or phase, and then from intermediate digits of an Animal Registration Number CN like the second embodiment upon failure of the selection noted just above. Upon failure of the further selection, it is possible to decide numerals to be used for farm use numbers FN while inserting a dummy numeral(s) into Animal Registration Numbers CN like the fourth embodiment.

Upon completion of the selection of Animal Registration Numbers CN corresponding to the farm use numbers FN requested by the farm, the administrative department is to transmit the selected Animal Registration Numbers CN and the requested farm use numbers FN to a pertinent ear tag issuing organization.

With the arrival of the data on ear tags from the administrative department, the Animal Registration Numbers CN and farm use numbers FN transmitted from the administrative department are printed by the pertinent ear tag issuing organization in a small typeface and in a large typeface at the required minimum number of digits, respectively, and then printed ear tags are distributed to the requesting farm.

According to the aforementioned system, farms are permitted to manage cows by utilizing ear tags printed with Animal Registration Numbers CN managed by the administrative department and farm use numbers FN required in the farms.

There will be now described a printing method for ear tags, in which: Animal Registration Numbers CN to be printed on ear tags are managed by a predetermined administrative department; ear tag issuing organizations (factories of ear tags) are established separately from the administrative department; and farmers go to an ear tag retail shop or an agricultural cooperative society, to obtain desired farm use numbers FN.

In this situation, it is assumed that the administrative department is provided with a computer for managing Animal Registration Numbers, and the computer is to include therein a database of available Animal Registration Numbers so that the administrative department is allowed to retrieve available Animal Registration Numbers CN from this database. It is further assumed that ear tag issuing organizations have computers communicating with the computer of the administrative department via telecommunication lines, respectively, such that the contents of the database of the administrative department are communicated to the computers of the ear tag issuing organizations, respectively, According to such a system, unused numbers in the database of Animal Registration Numbers prepared in the administrative department are periodically transmitted to each of databases separately prepared for ear tag issuing organizations, Meanwhile, concerning issuance of ear tags, each of the ear tag issuing organizations previously decides farm use numbers FN to be printed at the required minimum number of digits for individually identifying animals in farms, such as based on scales and yearly calf-birth states of respective farms. For example, each ear tag issuing organization is to previously settle certainly or probably necessary farm use numbers FN as consecutive numbers, such as a predetermined number of sets of farm use numbers FN from "1" to "20", another predetermined number of sets of farm use numbers FN from "1" to "30", and yet another predetermined number of sets of farm use numbers FN from "1" to "40". Next, from the periodically transmitted unused numbers in the database of each ear tag issuing organization, each ear tag issuing organization selects those Animal Registration Numbers CN, the pertinent digits of multiple digits of which numbers CN include the numerals included in the previously settled sets of consecutive numbers, respectively.

Then, each ear tag issuing organization is to inform the selected Animal Registration Numbers CN to the database of the administrative department, in order to inquire as to whether the selected Animal Registration Numbers CN are available or obtainable. If available. the administrative department issues a notice of usage allowance to the pertinent ear tag issuing organization, and eliminates the Animal Registration Numbers CN to be used by the penitent ear tag issuing organization from the unused numbers of the database of the administrative department. such an inquiry will be unnecessary if only one ear tag issuing organization exists, However, existence of ear tag issuing organizations at multiple locations requires a coordination and confirmation task of Animal Registration Numbers CN selected by each ear tag issuing organization, between the administrative department and each ear tag issuing organization. After the notice of usage allowance for the selected Animal Registration Numbers CN from the administrative department has arrived at the selecting ear tag issuing organization, this ear tag issuing organization is to manufacture the totally decided number of sets of farm use numbers FN as a due number of sets of consecutive numbers, by printing the Animal Registration Numbers CN and farm use numbers FN in a small typeface and in a large typeface at the required minimum number of digits, respectively. These manufactured ear tags printed with the due number of sets of consecutive numbers, respectively, are distributed to retail shops and agricultural cooperative societies as their stock or as their warehouse items.

Further, each farmer calls on an ear-tag retail shop or agricultural cooperative society when the farmer requires a set of ear tags printed with consecutive numbers, and purchases the required set from stock. Subsequently, the data concerning the purchaser of the set of ear tags may be transmitted to a pertinent ear tag issuing organization from the pertinent ear-tag retail shop or agricultural cooperative society, and the pertinent ear tag issuing organization may further inform this data to the administrative department.

This system allows a farm to readily obtain a set of ear tags printed with consecutive numbers desired by the farm, such as via an ear-tag retail shop and/or agricultural cooperative society.

According to the farm use number printing method of the present invention based on the required number of digits only, as described above, unique numbers can be effectively generated by maximally utilizing the generation frequence of numbers so as to cope with those numbers requested by farms, thereby providing an effect superior to the aforementioned European ear tag registration systems based on the enlarged 4-digit indication which fails to provide desired numbers. This also means that a farm is allowed to select its desired numbers so that duplication of the same numbers within the farm can be avoided.

Further, according to the present invention, since farm use numbers FN necessarily use some part of Animal Registration Numbers CN or some of the component digits of numbers CN, a corresponding relationship between the farm use numbers and the Animal Registration Numbers is stored in the data base of the administrative department. Thus, an appropriate countermeasure can be taken even upon occurrence of duplication of farm use numbers of ear tags. This means that another countermeasure can be taken even for duplication of farm use numbers FN, at a farm to which animals have been transferred, or at an animal market or abattoir. There will be later provided a further explanation in this point.

In the aforementioned embodiments, the ear tags according to the present invention have been described mainly with regard to cows as animals. However, subject animals of such ear tags are not particularly limited to cows.

Meantime, there will be now described several examples concerning a method for effectively registering Animal Registration Numbers CN in the aforementioned ear tags of the present invention into a database of a registering organization, Note, the method for selecting or establishing Animal Registration Numbers CN and farm use numbers FN for ear tags in the present invention is not limited to such examples.

(1) Stack Method:

This is a method to stack Animal Registration Numbers CN into the database, as literally represented, such that Animal Registration Numbers CN are used by sequentially stacking the numbers CN from the lowermost number thereof into the database. There is now exemplarily considered a situation where first, second and third farms have requested first, second and third sets of farm use numbers FN of "1" to "50", "1" to "80" and "1" to "40", respectively. The procedure in this situation is as follows;

(a) The FN's "1", to "50" of the first set are taken out or selected from CN's 000,000,001 to 000,000,050, respectively;

(b) The FN's "1" to "9" of the second set are taken out from CN's 000,000,051 to 000,000,059, respectively;

(c) The FN's "10" to "59" of the second set are taken out from CN's 000,000,110 to 000,000,159, respectively;

(d) The FN's "60" to "80" of the second set are taken out from CN's 000,000,060 to 000,000,080, respectively;

(e) The FN's "1" to "9" of the third set are taken out from CN's 000,000,081 to 000,000,089, respectively; and (f) The FN's "10" to "40" of the third set are taken out from CN's 000,000,210 to 000,000,240, respectively.

In this way, requested farm use numbers FN are provided by sequentially taking out or selecting available (i.e., unassigned) Animal Registration Numbers CN from the then available lowermost number in the CN's and by stacking the thus taken out Animal Registration Numbers CN into the database, thereby effectively utilizing the database.

Although the above taking-out procedure is conducted in an ascending order, a descending order is also possible.

(2) Block Method;

This is a method to arrange and use blocked registration frames of Animal Registration Numbers CN within the database. This method has an exemplary procedure as follows;

(a) Animal registration numbers CN are blocked every 500 numbers, in the database.

(b) Each block is assigned to a pertinent farm.

(c) Required Animal Registration Numbers CN are yearly taken out from a pertinent block.

(d) Upon exhaustion of Animal Registration Numbers CN within the pertinent block, the procedure is transferred to a new block of CN's, i.e., a new block is assigned to the pertinent farm.

(e) in transferring to the new block, the pertinent farm is to select whether the farm use number is continued or is reset/returned to the number at the time of starting.

(f) The above steps are repeated.

Although each block assigned to a farm has 500 pieces or units of Animal Registration Numbers CN in the aforementioned example, 1,000 units may be adopted. Then, it becomes possible to uniformly start from "1" even if direct 3-digit FN's are used, and thereafter the number FN is consecutively increased with the lapse of time. Turning to countries such as Japan which include many small scaled farms, it will take approximately 20 years to exhaust 1,000 FN's, during which no duplication of farm use numbers is caused within a farm where animals are bred.

(3) Mini-Block Method:

This is a method to mini-block the blocks according to the method (2) into minimum blocks, as a method for effectively managing a database. This method has an exemplary procedure as follows;

(a) Animal registration numbers CN are blocked every 100 numbers, in the database.

(b) Each block is assigned to a pertinent farm.

(c) Required Animal Registration Numbers CN are yearly taken out from a pertinent block.

(d) Upon exhaustion of Animal Registration Numbers CN within the pertinent block, the procedure is transferred to a new unused block of CN's, i.e., the new unused block is assigned to the pertinent farm.

(e) In transferring to the new block, the pertinent farm is to select whether the farm use number is continued or is reset/returned to the number at the time of starting.

(f) The above steps are repeated.

This mini-block method is differentiated from the block method in that the former mini-blocks Animal Registration Numbers CN into blocks including 100 pieces of CN's. This means that numbers from "1" to "99" are included in one mini-block, by neglecting each numeral at the hundreds digit of each CN.

In this mini-block method, if 3-digit farm use numbers FN are adopted, there will be very probably and frequently used those Animal Registration Numbers CN having end digit numerals "1" and "2" at the hundreds digit of each CN, i.e., those numbers CN represented as "1XX" and "2XX", in a manner more than those CN's having numerals other than "1" and "2" at the hundreds digit of each CN. This may act as a bottleneck to thereby deteriorate a usage efficiency of unique numbers (Animal Registration Numbers). In such a case, it is possible to insert a dummy numeral into a 3rd digit (hundreds digit) as described concerning FIG. 8, to thereby allow effective occurrence of unique numbers without imposing any restriction on farm use numbers required by farms.

(4) Random Method:

This random method more effectively utilizes available ones of Animal Registration Numbers CN, such that requested farm use numbers FN are randomly taken out within a database. These requested farm use numbers FN may be taken out from anywhere in the Animal Registration Numbers CN, so that no restriction is imposed on the selection of CN's from within the database. Thus, Animal Registration Numbers CN within the database Can be effectively utilized, even without adopting dummy numerals. Moreover, upon exhaustion of Animal Registration Numbers CN according to this random method, it is then possible to adopt insertion of a dummy numeral(s) as described above.

In addition, there is not absolutely required any specific expression method for an indication field of each unique number (i.e., Animal Registration Number ON) according to the methods (1) through (3), since a farm use number is supposed to be matched with a lower digit(s) of a corresponding unique number. In the random method just above, however, such as a marks to be attached, if necessary, to suitable digits of an Animal Registration Number CN as described concerning FIG. 6, such as to show which digits of the Animal Registration Number CN farm use numbers FN is selected from.

Figure 23:
FIG. 23 is a view explaining duplications of enlarged numbers of ear tags according to the present invention when cows attached with the ear tags have been collected at a predetermined place from respective farms.

Lastly, there will be described an individual managing method utilizing animal registration ear tags according to the present invention. This individual managing method is adapted to conduct individual management in case of the occurrence of duplication of enlarged numbers applied to ear tags, when animals (cows) carrying ear tags printed with farm use numbers at required minimum number of digits are collected from farms to a certain place. For example, as shown in FIG. 23, there is of course caused duplication of farm use numbers FN printed on ear tags 21 attached to cows 20 (farm use numbers "60" are duplicated here) such as in a prize show, market or abattoir where animals are collected from farms. The individual managing method according to the present invention overcomes this problem.

As mentioned previously, the European systems have: enlargedly printed lowermost 4 digits of Animal Registration Numbers; or indicated Animal Registration Numbers in multiple rows such that numerals at lowermost 4 digits of Animal Registration Numbers are enlargedly printed on ear tags, as farm-use individual identification numbers. Such 4-digit numbers have been utilized for visually identifying cows in farms. Usage of 4-digit number is to restrict trouble to a minimum, by avoiding confusion among animals due to duplication of ear-tag numbers. However, even 4-digit numbers may result in duplication, and none of the European systems has completely overcome this duplication problem.

Turning to ear tags based on the present invention, farm use numbers to be enlargedly printed on ear tags and to be visually recognized in farms are provided not by numerals at standardized or uniformalized 4 to 5 digits but by numerals at required minimum number of digits such as 1 digit through 3 digits and possibly 4 digits. Thus, it is rather likely that duplication of farm use numbers of ear tags of multiple animals is caused at a place where animals are collected from farms. There will be described hereinafter a countermeasure according to the present invention against such a situation as shown in FIG. 23 (where the animals are cows, and the duplicated numbers are "60").

(1) Identification by Combination of Ear Tag and Neck Tag:

Animal registration numbers of cows collected to a market or abattoir are read out from ear tags attached to cows or from individual identification cards (called passports) appended to cows, and inputted into a computer at the collected place. It is also possible to input Animal Registration Numbers of collected cows into a computer by a method other than the above.

Each ear tag of the present invention carries a piece of information in the form of numeral or barcode: concerning an enlargedly indicated farm use number in addition to an Animal Registration Number of a cow; or concerning as to which part of an Animal Registration Number has been enlargedly indicated. Thus, by reading an ear tag by a barcode reader or by a scanner provided with an OCR function, a computer can read out an Animal Registration Number of a cow and a farm use number enlargedly indicated on the ear tag. It is also possible to print a barcode on a passport to be appended to a cow, such that the barcode includes information as to which portion of digit(s) of the Animal Registration Number has(have) been enlargedly indicated.

Figure 24:
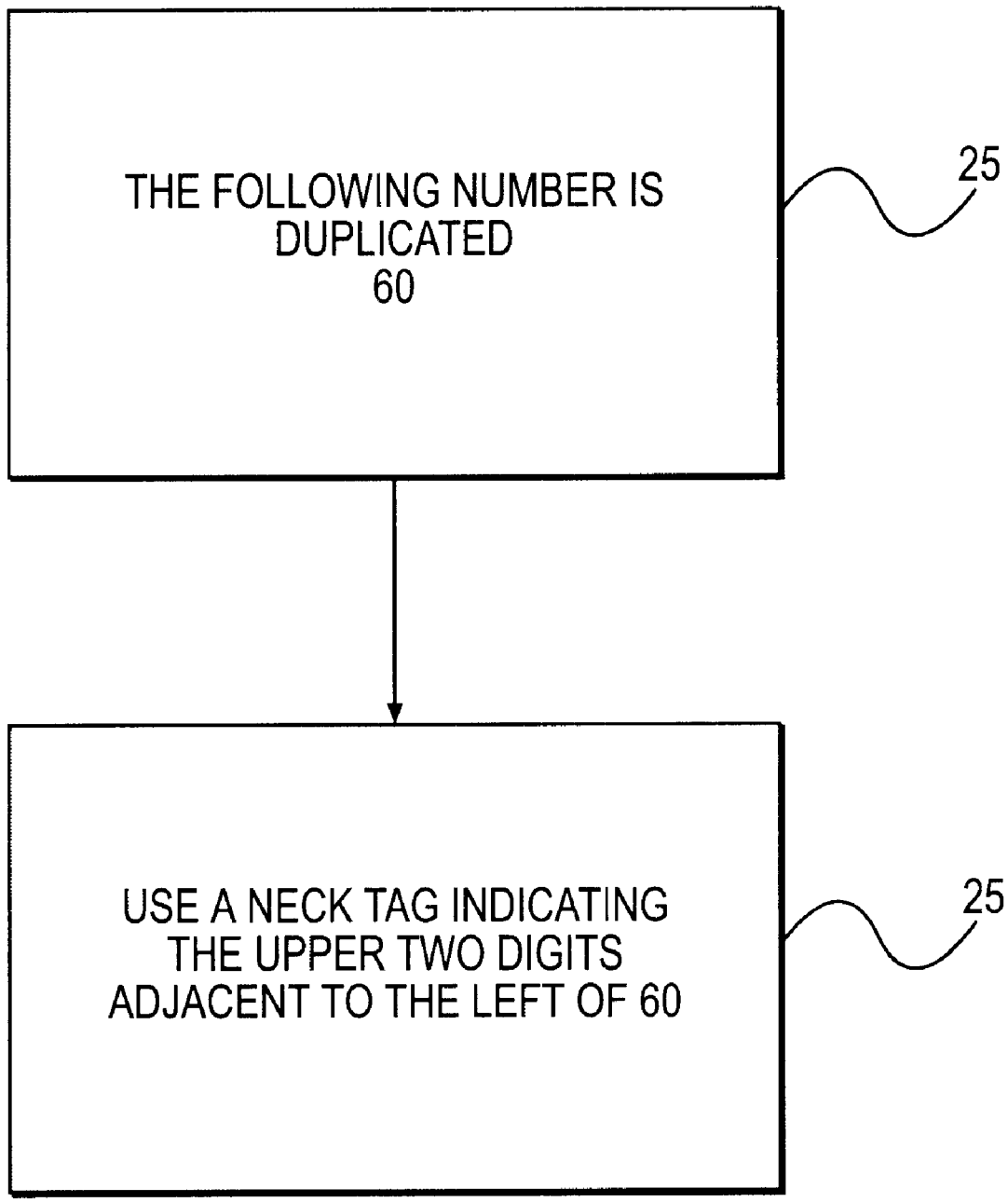
FIG. 24 is a view showing an instruction line to be displayed on a display device, when duplication of enlarged numbers of ear tags has occurred at the collecting place of cows.

Upon reading farm use numbers after Animal Registration Numbers by the computer, the computer decides duplicated farm use numbers of cows collected at this time, and indicates a procedure for differentiating cows having ear tags of duplicated farm use numbers, on a display device 25 of the computer such as shown in FIG. 24. In the example shown in FIG. 23, there exists duplication of farm use numbers "60", of ear tags 21. Thus, in the example shown in FIG. 24, it is suggested that the differentiation should be conducted by hanging neck tags printed with or containing a number consisting of 2 numerals selected from the more significant digits of the farm use numbers "60", on the pertinent cows, respectively.

Such neck tags may be supplied by automatically printing the numerals 2 digits more significant than "60" by the managing computer at the collected place, by distributing blank neck tags to the owners of the pertinent cows so that they can write the numerals 2 digits more significant than "60", or by selecting suitable neck tags from previously provided ones. Upon hanging such neck tags on the necks of the pertinent cows at the collected place, respectively, the cows can mutually be differentiated by the visually recognizable large numbers on the neck tags.

Figure 25:
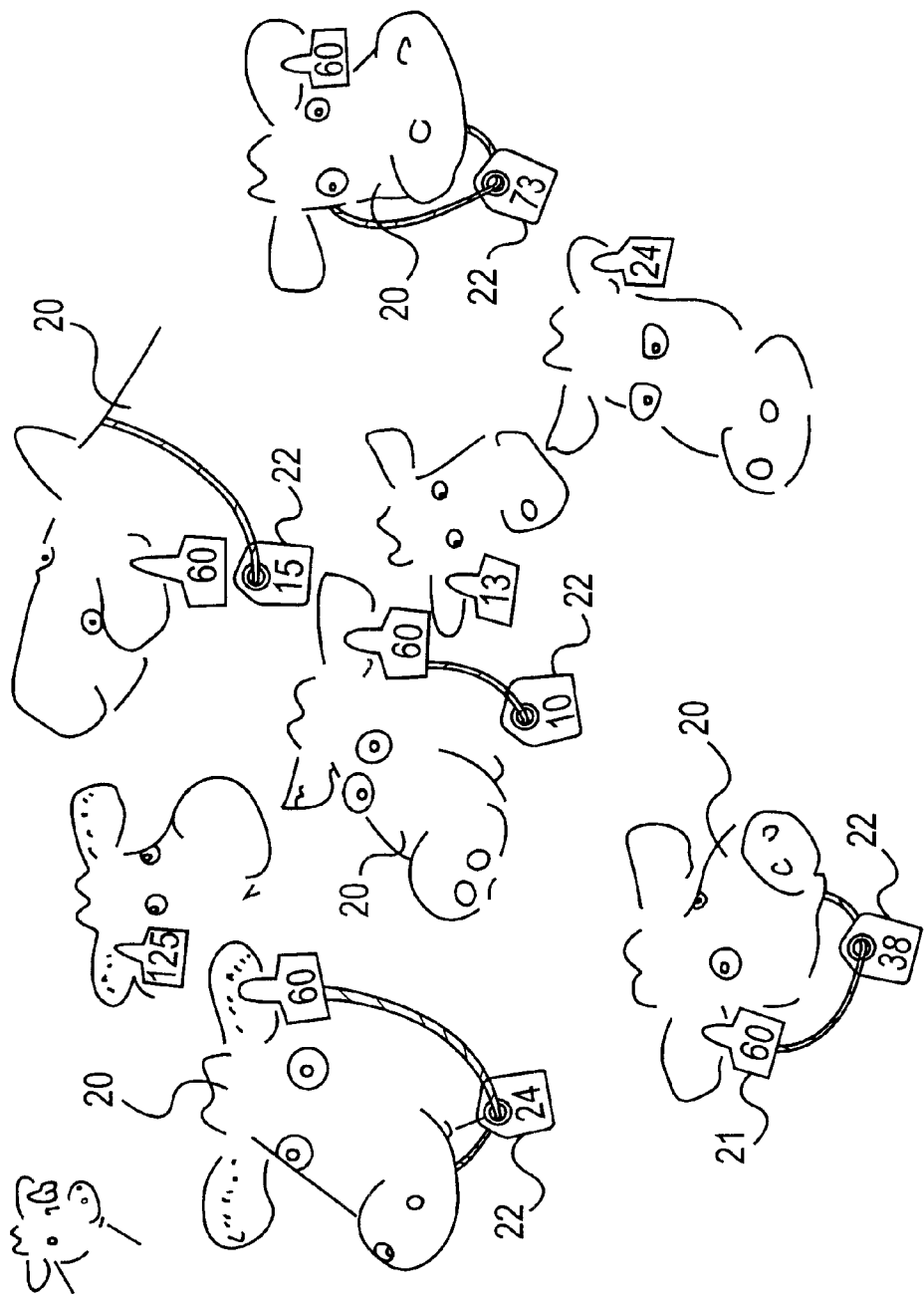
FIG. 25 is a view explaining identification of cows having duplicated numbers, respectively, by means of neck tags, when duplication of enlarged numbers of ear tags has occurred at the place for collecting cows.

FIG. 25 shows the situation where neck tags 22 printed or entered with 2 digit numerals more significant than the duplicated farm use numbers have been hung on those cows 20 having duplicated farm use numbers FN printed on their ear tags 21, respectively. As seen from FIG. 25, the necks of the five cows having duplicated farm use numbers "60" have been hung with neck tags 22 carrying numbers "10","15", "24", "38", and "73", respectively, so that the differentiation among the cows 20 attached with the same farm use numbers can be readily conducted at the collecting place of these cows 20.

In the aforementioned example, the number to be entered in neck tag 22 is constituted by 2 numerals selected from 2 digits more significant, in a farm use numbers, than the digits of the duplicated number. However, there may be adopted a 1digit numeral more significant than a farm use number, if differentiation is possible. Contrary, there may be adopted a number made of 3 or more numerals selected from more significant digits in a farm use number, when duplication has still occurred even in numbers provided by 2 digit numerals. For example, those cows 20 having additionally duplicated numbers provided by 2 digit numerals of duplicated farm use numbers may be provided with neck tags 22 printed or entered with 3 digit numerals.

Relatedly, when the duplicated farm use number "60" has been provided by enlarging consecutive numerals in an Animal Registration Number, 2 digit numerals to be entered in a neck tag may be those more significant than the duplicated number. Further, when the duplicated farm use number "60" has been provided by enlarging discontinuous numerals in an Animal Registration Number such as described concerning FIG. 6C, 2 digit numerals to be entered in a neck tag may be those more significant than the duplicated number. Moreover, such as when the duplicated farm use number "60" has been provided by enlarging 2 digit numerals from the most significant in an Animal Registration Number so that no numerals exist at the left side of the duplicated number, it is possible to take out 2 digit numerals from the least significant 2 digits of the Animal Registration Number than the duplicated number. Namely, where the previously described methods are not applicable in case of duplication of farm use numbers, it is possible to take out 2 or 3 digit numerals included in Animal Registration Numbers and enter them in neck tags such that no duplication is caused among numbers entered in neck tags.

In this way, by using neck tags for cows having duplicated farm use numbers at the collecting place such as an animal auction market, it becomes possible to confirm cow identity at a distance. Thus, the method of the present invention above-described is extremely effective when duplication occurs among the farm use numbers.

Note, the aforementioned neck tags are not absolutely necessary for individually identifying animals, and individual identification can be conducted even in the case of omission of neck tags. The method therefor will be described hereinafter.

(2) Identification by Ear Tag and Auxiliary Card:

This is a situation utilizing an ear tag and an auxiliary card recorded with all the contents of the ear tag. Such an auxiliary card is distributed to a farm together with an ear tag. FIG. 26 shows such an auxiliary card 23 which carries at least a barcode BC printed on an ear tag (not shown) and an Animal Registration Number printed under the barcode BC.

Figure 27:
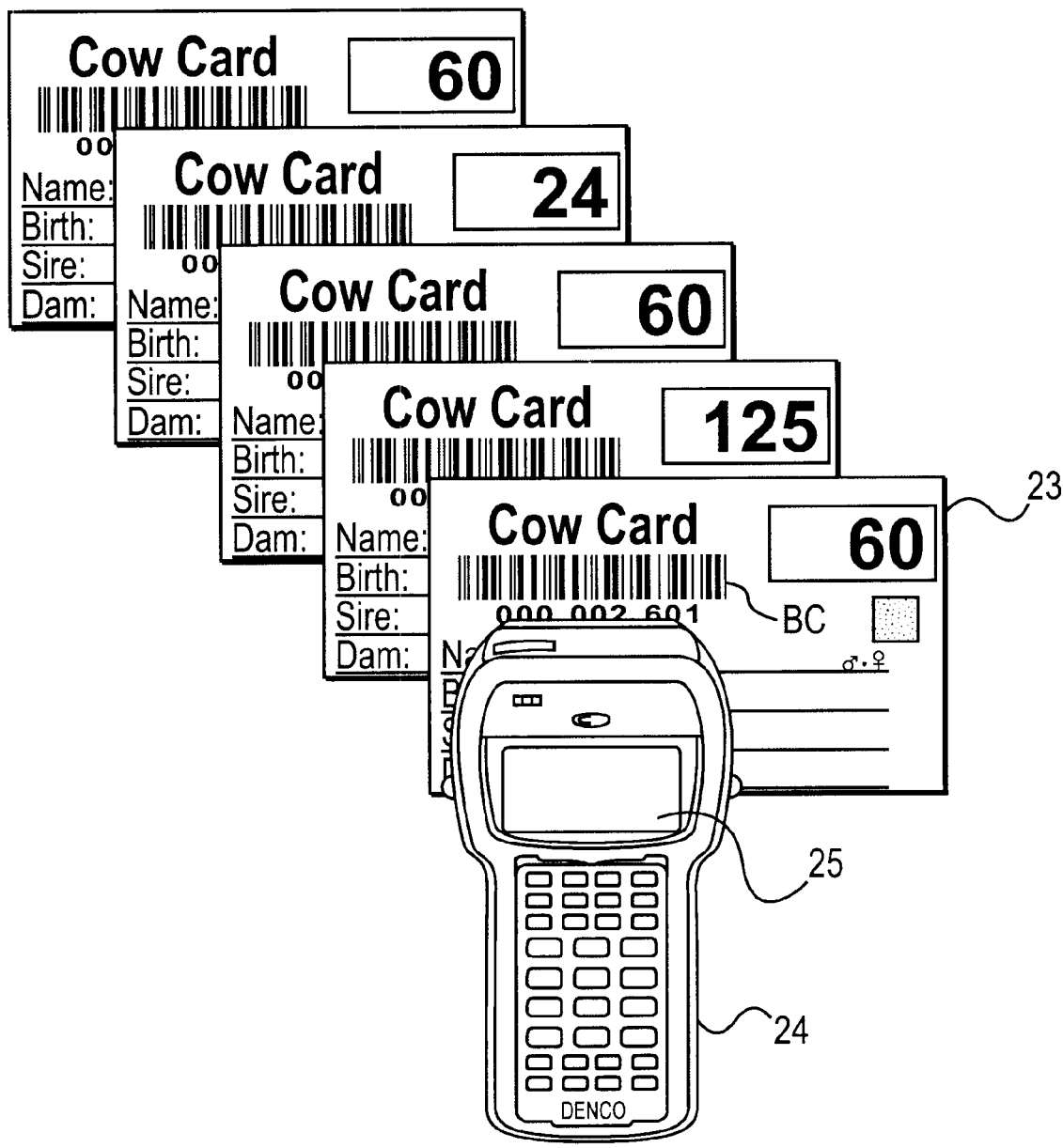
FIG. 27 is a view showing an example of a card recorded with an individual cow information in a barcode form and attached to a cow, and a hand-held terminal for reading the barcode.

This barcode BC contains information "10-000-002-602-5" in case of the auxiliary card 23 at the upper right corner of FIG. 26. The leading numerals "10" indicates that the farm use number "2" is provided by enlarging a numeral at the least significant 1digit of the Animal Registration Number "000002602", and the last digit "5" of the information is a check digit of the barcode BC. In addition to the Animal Registration Number of a pertinent cow and the enlarged farm use number both printedly included in the barcode BC, the auxiliary card 23 is further entered such as with the name of the cow, its place of birth, and names of its sire and dam. FIG. 27 shows a situation where the information of the auxiliary cards 23 are taken out by a terminal device 24.

In the example as described above, even without inputting an Animal Registration Number and a farm use number of a cow from an ear tag, it is possible to input such numbers into a data processor by the auxiliary card 23 printed with the contents same with the ear tag. The procedure thereafter may be identical with the above item (1), to thereby provide neck tags with such numbers so as to avoid duplication.

Figure 28:
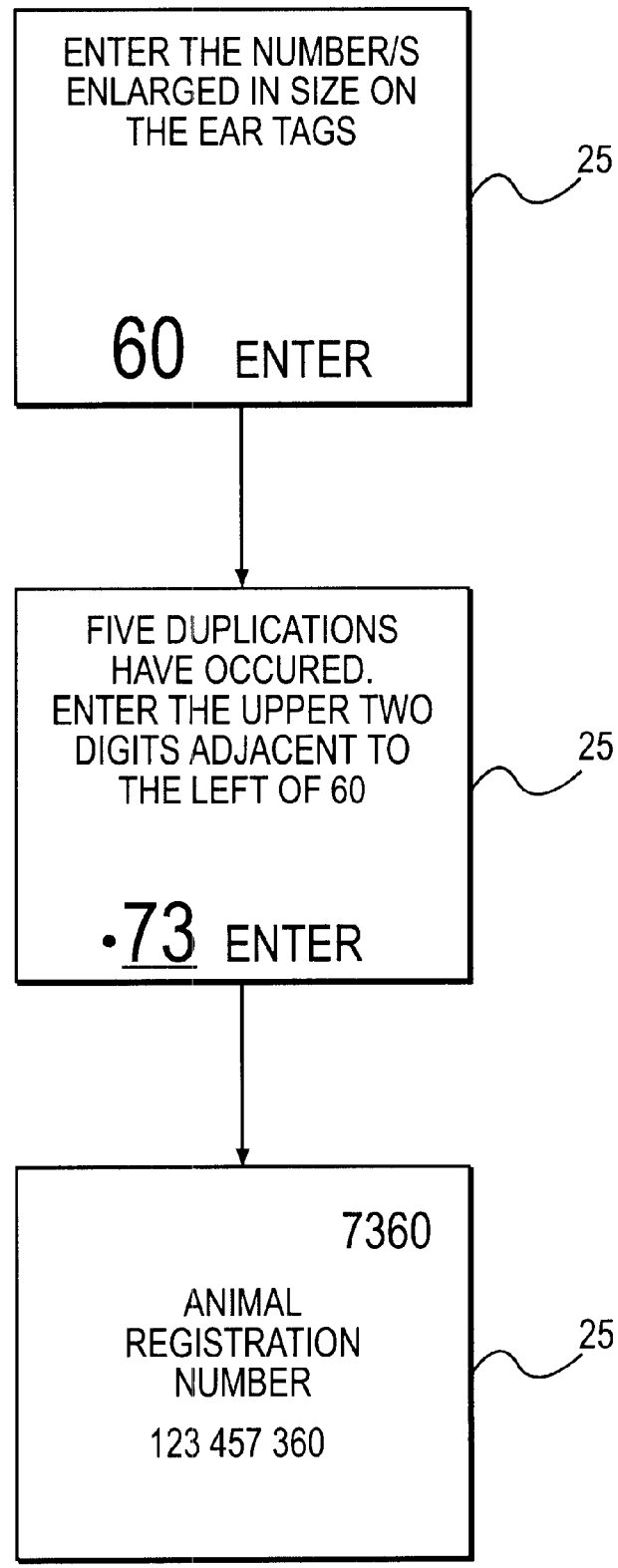
FIG. 28 is a view explaining identification of cows having duplicated numbers, respectively, by means of the card, when duplication of enlarged numbers of ear tags has occurred at the collecting place of cows.

In the example described just above, Animal Registration Numbers and farm use numbers can be entered by utilizing auxiliary cards 23. Thus, even in case of omission of neck tags, information can be obtained from the auxiliary card. There will be now considered a sequence with the omission of a neck tag where a farm use number "60" is inputted into the terminal device, and duplication of the inputted farm use number is suggested as shown in FIG. 28. At the beginning of such a sequence, the display device 25 of the terminal device displays an instruction message that "ENTER THE NUMBER/S ENLARGED IN SIZE ON THE EAR TAGS". Upon entering the farm use number "60", there is displayed another instruction message as to what additional data will render the duplicated number "60" be differentiated, as shown in the next screen. in this case, upon entering numerals "73" which is 2 digits more significant than the farm use number "60", the display device 25 displays a new farm use number "7360" together with the Animal Registration Number, to thereby enable individual identification of cows at this time at the collected place.

According to the aforementioned methods, individual identification of cows can be conducted: without fully inputting an Animal Registration Number; or by an auxiliary card without relying on an ear tag. This has a great effect in an actual task on a farm. Considering a situation necessary to identify cows at a distance therefrom such as in a qualification service for measuring a volume of milk production, it was necessary to view a number on an ear tag according the European methods. According to the present invention, however, enlargedly printed simple numbers are very legible, and even duplication of such numbers can be overcome by the aforementioned methods to allow individual identification, thereby promoting the tasks.

Further, the countermeasure against duplication of farm use numbers according to the present invention can be also effectively applied to a system where farm use numbers are arbitrarily entered in ear tags with respect to Animal Registration Numbers, and the arbitrarily entered numbers of ear tags are correlated with Animal Registration Numbers by preparing a correspondence list for both kinds of numbers.

INDUSTRIAL POSSIBILITY OF THE INVENTION

According to the constitution of the ear tag, the method of printing such an ear tag, and the individual managing method using such an ear tag as disclosed by the present invention, farm use numbers are enlarged so as to be readily visible from the outside and no duplication of numbers can be caused at the first farm, thereby promoting management of animals in farms. Further, Animal Registration Numbers can be utilized without wastefulness, by devising procedures to take out farm use numbers from Animal Registration Numbers.

Further, since numerals included in Animal Registration Numbers are utilized for identification upon duplication of farm use numbers at a place where animals are collected or at a farm to which animals have been transferred, animals can be readily distinguished from one another even upon duplication of farm use numbers. Thus, tasks requiring animal identification are rendered extremely effective and precise, thereby providing an economically great effect.

What is claimed is:

1. An ear tag for attachment to an ear of an animal to identify an individual tagged animal, comprising:
   a tag portion having opposite sides;
   an Animal Registration Number printed on at least one of the opposite sides of said tag portion, said Animal Registration Number consisting of codes including numerals, letters, or barcodes, and having multiple digits; and
   an enlarged number printed on the same or a different side of said tag portion on which said Animal Registration Number is printed, said enlarged number consisting of a minimum number of digits of said Animal Registration Number needed by an individual farm for identifying all tagged animals on the farm.

2. An ear tag according to claim 1, wherein said enlarged number is selected from adjacent digits of said Animal Registration Number, when said enlarged number has multiple digits.

3. An ear tag according to claim 1, wherein said enlarged number is selected to be discontinuous from said digits of said Animal Registration Number, when said enlarged number has multiple digits.

4. An ear tag according to claim 2 or 3, wherein one or more digits of said enlarged number can be distinguished by eye in said multiple digits of the Animal Registration Number in relation to other digits thereof.

5. An ear tag according to claim 2 or 3, wherein information of said enlarged number is contained in a barcode when said Animal Registration Number is printed in the form of a barcode on said ear tag portion.

6. An ear tag according to claim 1, wherein said enlarged number includes a code not included in said Animal Registration Number, and said code is contained in said Animal Registration Number as a dummy digit that can be distinguished from the other digits of said Animal Registration Number.

7. An ear tag according to claim 6, wherein said enlarged number is printed on one of left, right, or center positions of said tag portion, and an unprinted space is on at least one of the left and right sides of said enlarged number, when said enlarged number has fewer digits than the maximum number of digits that can be printed on said tag portion.

8. An ear tag according to claim 7, wherein a guide mark for indicating an area on the tag portion to be filled in by a printed code is printed on said tag portion.

9. An ear tag according to claim 6, wherein said enlarged number is a one-digit number or a two-digit number, and at least one figure "0", having the same size as said enlarged number, is printed on the left side of said enlarged number so that said enlarged number has no more than three digits.

10. An ear tag according to claim 6, wherein said enlarged number is a one-digit number or a two-digit number, and at least one figure "0", having a smaller size than said enlarged number, is printed on the left side of said enlarged number so that said enlarged number has no more than three digits.

11. An ear tag according to one of claims 9 or 10, wherein the print density or color of said figure "0" of said enlarged number is lighter than the print density or color of the one-digit number or two-digit number of said enlarged number.

12. An ear tag according to claim 9 or 10, wherein said figure"0" on the left side of said enlarged number is printed as an outline character.

13. An ear tag according to claim 1, wherein said enlarged number is printed on one of left, right, or center positions of said tag portion, and an unprinted space is on at least one of the left and right sides of said enlarged number, when said enlarged number has fewer digits than the maximum number of digits that can be printed on said tag portion.

14. An ear tag according to claimed 13, wherein a guide mark for indicating an area on the tag portion to be filled in by a printed code is printed on said tag portion.

15. An ear tag according to claim 1, wherein said enlarged number is a one-digit number or a two-digit number, and at least one figure "0", having the same size as said enlarged number, is printed on the left side of said enlarged number so that said enlarged number has no more than three digits.

16. An ear tag according to claim 1, wherein said enlarged number is a one-digit number or a two-digit number, and at least one figure "0", having a smaller size than said enlarged number, is printed on the left side of said enlarged number so that said enlarged number has no more than three digits.

17. An ear tag according to one of claims 15 or 16, wherein the print density or color of said figure "0" of said enlarged number is lighter than the print density or color of the one-digit number or two-digit number of said enlarged number.

18. An ear tag according to claim 15 or 16, wherein said figure "0" on the left side of said enlarged number is printed as an outline character.

19. A method of identifying an individual animal on a farm by distinguishing it from another on the farm, using an ear tag according to claim 1 and a data processor at a place where animals are collected from each of a plurality of farms, comprising the steps of:

inputting said Animal Registration Number printed on said ear tag and further inputting a farm use number to said data processor;

detecting a duplication of said farm use number among said ear tags attached to each animal grouped at designated place for a specific purpose by said data processor; and displaying an instruction to add and indicate at least one digit of the figures included in said Animal Registration Number to said farm use number in order to distinguish the duplicated farm use number from another when said data processor detects the duplication of said farm use number on said ear tag.

20. A method of identifying an individual animal on a farm by distinguishing it from another on the farm, using an ear tag according to claim 1, a card for subsidiary use with said ear tag and containing all of the information provided by said ear tag, and a data processor at a place where animals are collected from each of a plurality of farms, comprising the steps of:

inputting said Animal Registration Number printed on said ear tag or said card and further inputting a farm use number to said data processor;

detecting a duplication of said farm use number among said ear tags attached to each animal grouped at designated place for a specific purpose by said data processor; and displaying an instruction to add at least one digit of the figures included in said Animal Registration Number to said farm used number in order to distinguish the duplicated farm use number from another when said data processor detects the duplication of said farm use number on said ear tag.

21. A method of printing an Animal Registration Number on an ear tag for attachment to an ear of an animal to identify an individual tagged animal, the Animal Registration Number being controlled by a specific organization and consisting of codes including numerals, letters, or barcodes and an enlarged number to identify the individual tagged animal, comprising the steps of:

requesting said specific organization to supply an individual farm with an enlarged number as a private number having no more than four digits, to identify an individual tagged animal on the individual farm;

selecting said Animal Registration Number to include all or all but one of the figures forming digits of said enlarged number, from a previously prepared database of Animal Registration Numbers at said specific organization;

transmitting said selected Animal Registration Number and said enlarged number from said specific organization to an ear tag issuing organization; and printing said Animal Registration Number transmitted from said specific organization on said ear tag and printing said enlarged number included in said Animal Registration Number in a minimum number of digits at said ear tag issuing organization.

22. A method of printing an Animal Registration Number on an ear tag for attachment to an ear of a tagged animal on an individual farm, the Animal Registration Number being controlled by a specific organization and consisting of codes including numerals, letters, or barcodes and an enlarged number to identify the tagged animal, comprising the steps of:

regularly transmitting unused numbers in a database including said Animal Registration Number, the database having been previously prepared at said specific organization, to another database provided at an ear tag issuing organization;

arranging a set of figures for said enlarged number to be printed on each said ear tag for said individual farm in a minimum number of digits to identify all tagged animals at said individual farm, and then selecting an Animal Registration Number which includes all of the figures of all of said enlarged numbers for an individual farm somewhere in the multiple digits of the Animal Registration Number from the database of said tag issuing organization;

transmitting said selected Animal Registration Number to the database of said specific organization from said ear tag issuing organization and deleting an unused number corresponding to said selected Animal Registration Number from said database of said specific organization; and printing said selected Animal Registration Number and said enlarged number on each said ear tag in a minimum number of digits at said ear tag issuing organization, after transmitting said selected Animal Registration Number to said database of said specific organization from said ear tag issuing organization.

* * * * *